United States Patent [19]

Moore et al.

[11] Patent Number: 5,319,757
[45] Date of Patent: Jun. 7, 1994

[54] FORTH SPECIFIC LANGUAGE MICROPROCESSOR

[75] Inventors: Charles H. Moore, Woodside, Calif.; Robert W. Murphy, Scottsdale, Ariz.

[73] Assignee: Harris Corporation, Melbourne, Fla.

[21] Appl. No.: 745,764

[22] Filed: Aug. 16, 1991

Related U.S. Application Data

[63] Continuation of Ser. No. 336,632, Apr. 10, 1989, Pat. No. 5,070,451, which is a continuation of Ser. No. 673,694, Nov. 21, 1984, abandoned.

[51] Int. Cl.$^5$ .............................................. G06F 12/00
[52] U.S. Cl. ...................................... 395/375; 364/243; 364/243.1; 364/247; 364/247.1; 364/247.4; 364/247.5; 364/247.7; 364/258; 364/260; 364/DIG. 1
[58] Field of Search ............... 395/375, 425; 364/243, 364/243.1, 247, 247.1, 247.4, 247.5, 247.7, 258, 260, DIG. 1

[56] References Cited

U.S. PATENT DOCUMENTS

| | | | |
|---|---|---|---|
| 3,601,809 | 8/1971 | Gray et al. | 364/200 |
| 3,965,335 | 6/1976 | Ricci et al. | 395/275 |
| 4,041,462 | 8/1977 | Davis et al. | 364/200 |
| 4,128,878 | 12/1978 | Yasuhara et al. | 364/200 |
| 4,156,796 | 5/1979 | O'Neal et al. | 364/900 |
| 4,200,930 | 4/1980 | Rawlings et al. | 395/200 |
| 4,362,926 | 12/1982 | Dakouski et al. | 375/37 |
| 4,390,946 | 6/1983 | Lane | 364/200 |
| 4,393,468 | 7/1983 | New | 364/200 |
| 4,458,325 | 7/1984 | Nakata et al. | 364/705 |
| 4,800,491 | 1/1989 | Hardy | 364/200 |
| 5,187,799 | 2/1993 | McAuley et al. | 395/800 |

OTHER PUBLICATIONS

"System Design and Hardware Structure of a forth Machine System", Wada et al., Systems–Computers–Controls, vol. 13, No. 2 Mar. 1982.
"The Design of a Forth Computer", Vaughan et al., Journal of Forth Application and Research, vol. 2, No. 1, 1984, pp. 49–64.
"Single–Chip Micro Speaks Forth", Computer Design, vol. 22, Oct. 1983, pp. 141–142t.
"Complete Control with Forth on a Chip", Robotics Age, vol. 5, Nov./Dec. 1983, pp. 17–23.
"Microprogramming Techniques Using the AM2910 Sequencer", John Mick, IEEE 1978, pp. 81–87.
"Operand Interchange Mechanism", Metz et al., IBTM TDB, vol. 17, No. 1, Jun. 1974, pp. 80–81.
The KOF.9 Computer System by A.C.D. Haley, English Electric Co., Ltd. Kidsgrove, Stoke-on-Trent, England–AFIPS Conference Proceedings, vol. 22, 1962, Fall Joint Computer Conference (Spartan Books).

Primary Examiner—Joseph L. Dixon
Assistant Examiner—Jack A. Lane
Attorney, Agent, or Firm—Charles E. Wands

[57] ABSTRACT

A microprocessor for facilitating use of FORTH computer language includes a top register for storing a first parameter and an Arithmetic logic unit (ALU) connected to the top register for processing the first parameter with other parameters and for storing the results in the top register. An index register stores a second parameter and addresses main memory and pops and pushes the second parameter with respect to a return Last in/first out (LIFO) stack. A next parameter register stores a third parameter and pops andpushes the third parameter with respect to a next parameter LIFO stack. Anh addressing multiplexer is coupled to the index register and the next parameter register. A first swap connection to the top and index registers enables single cycle exchange of the first and second parameters between these two registers. A second swap connection between these registers permits a single cycle exchange of the first parameter and the third parameter between the top and next parameter registers. The memory, return LIFO, stack and next parameter LIFO stack comprise discrete and separate memory areas not accessible.

2 Claims, 6 Drawing Sheets

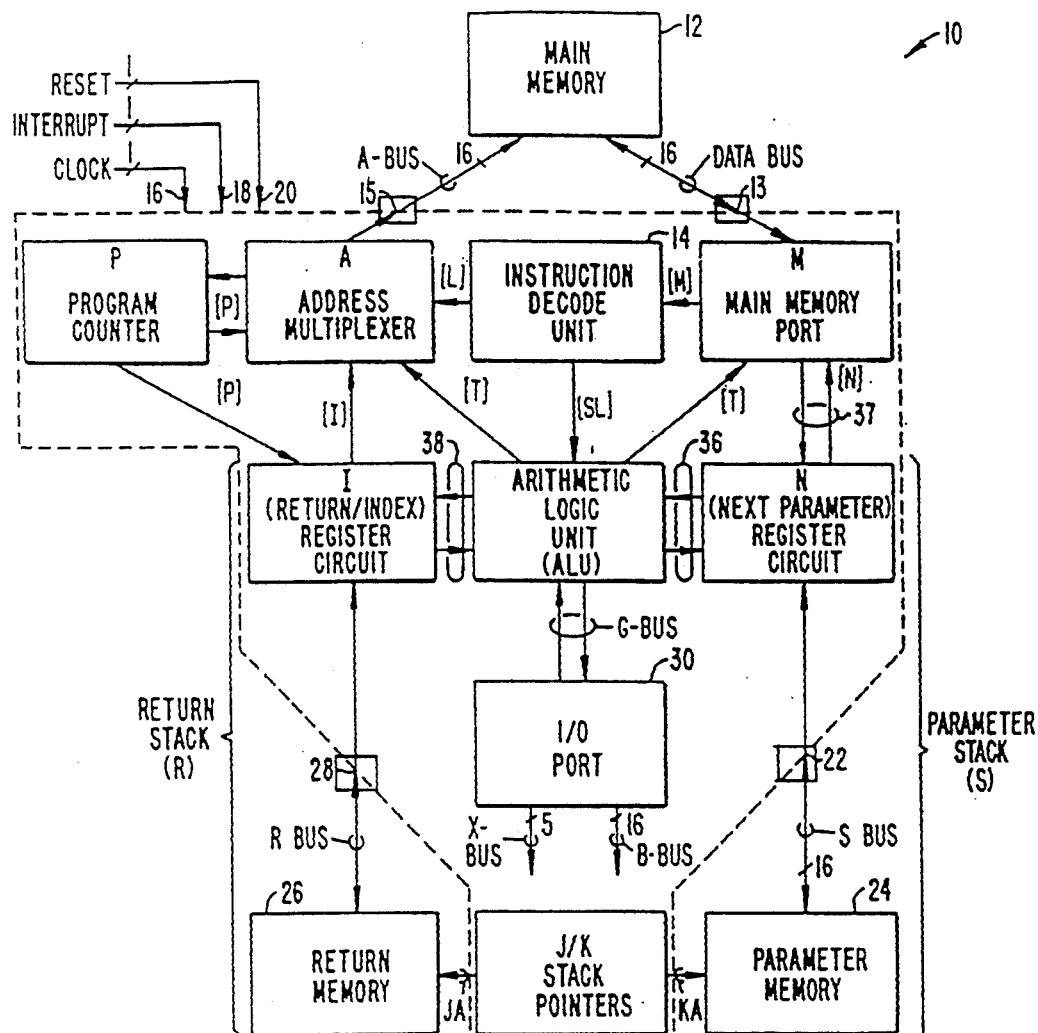
FIG.—1.
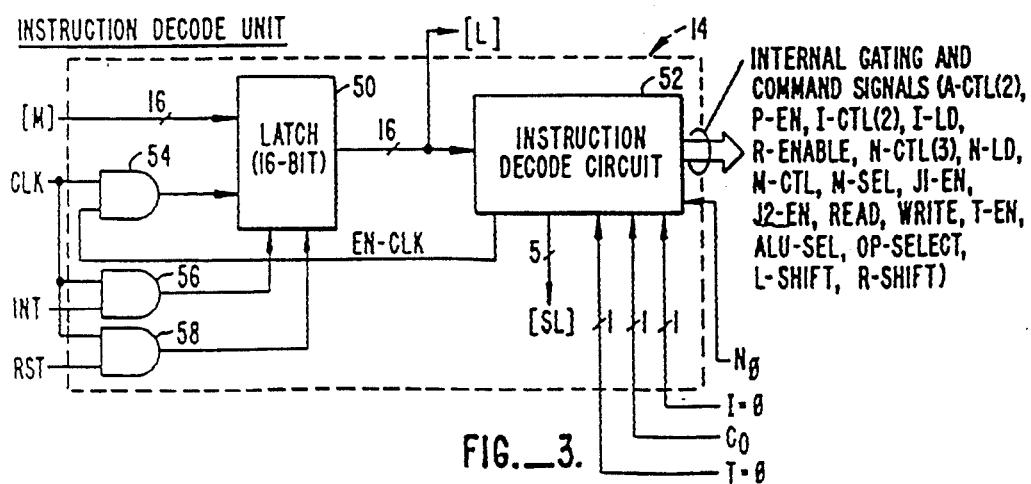
FIG.—3.

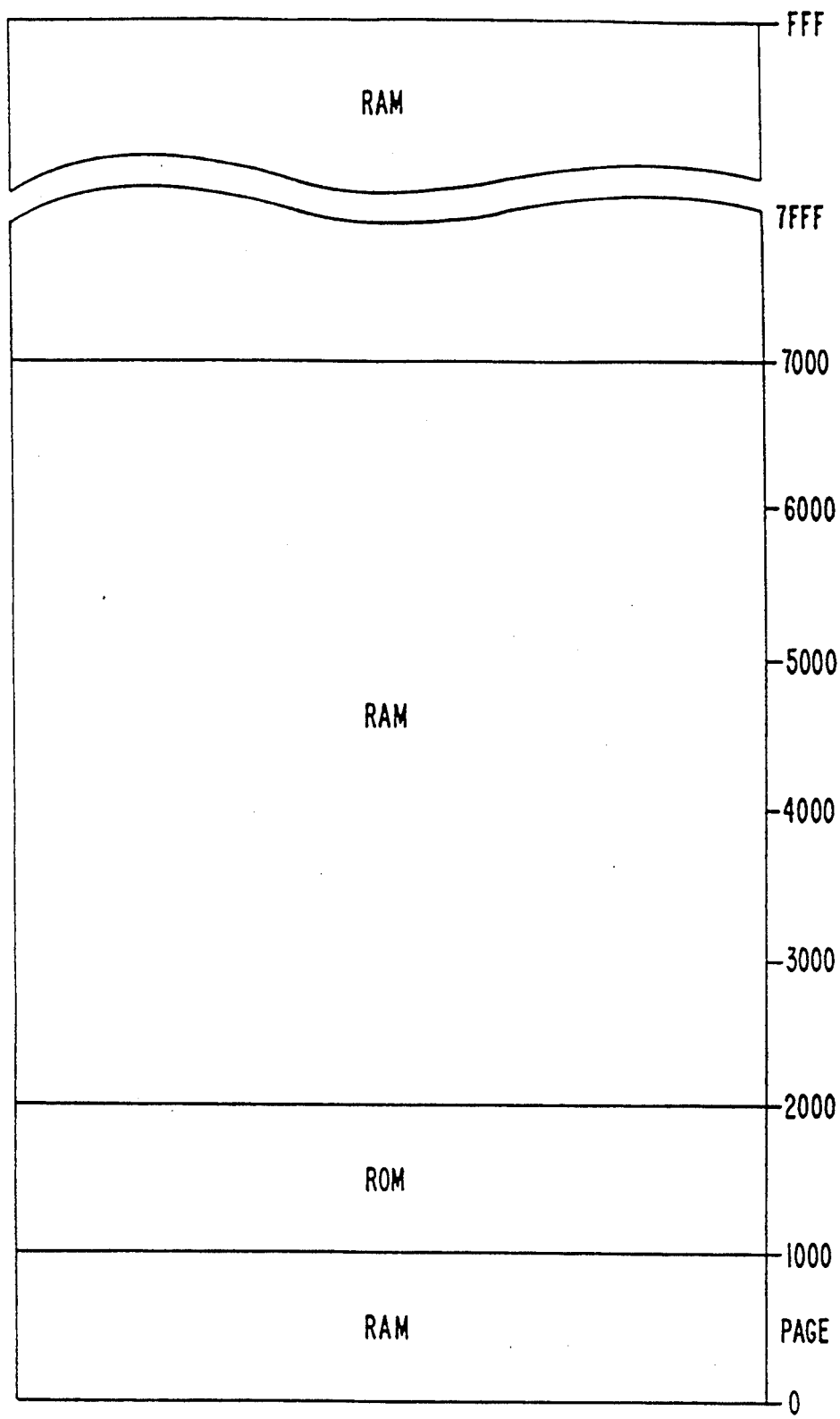
FIG._2.

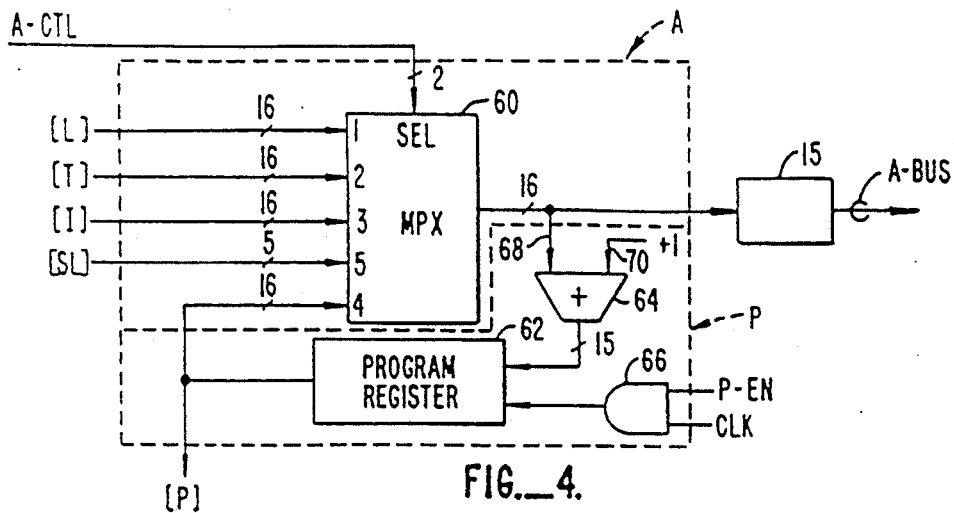
FIG._4.
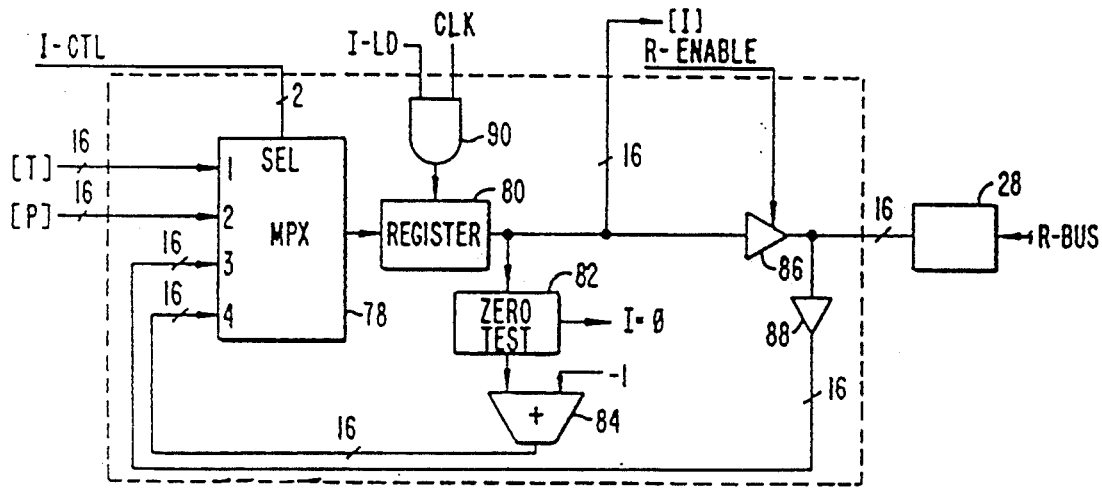
FIG._5.
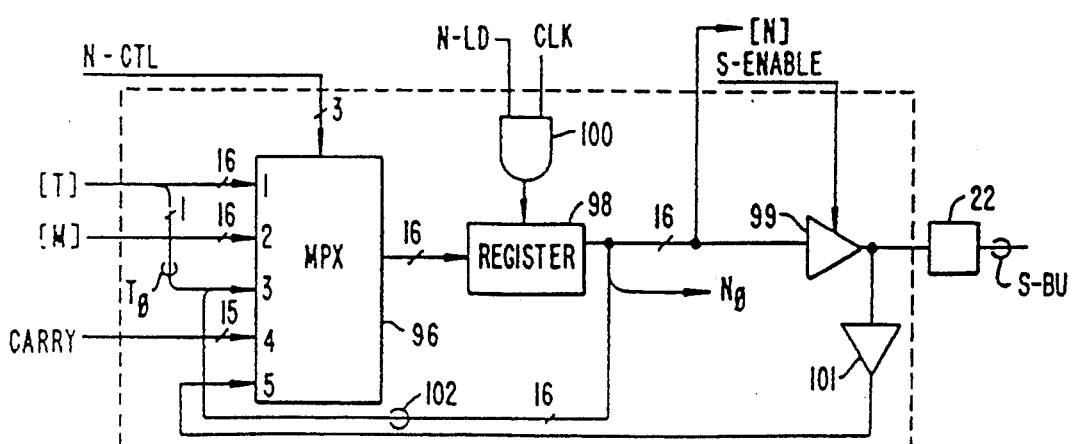
FIG._6.

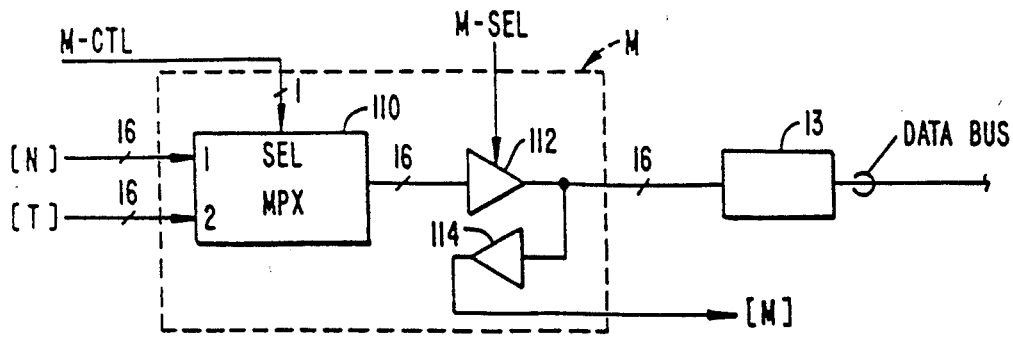
FIG._7.
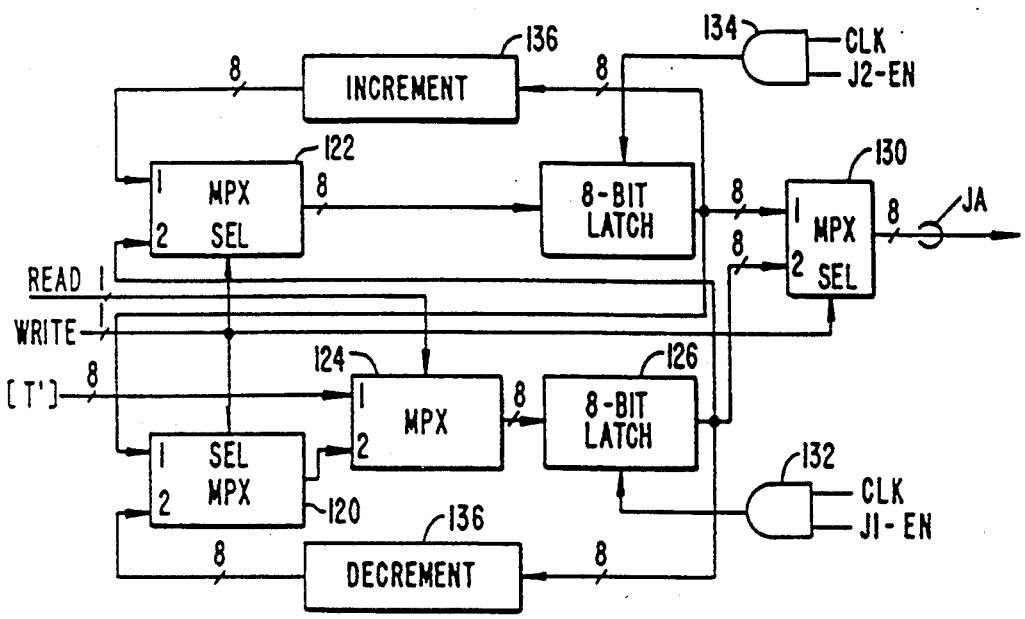
FIG._8.
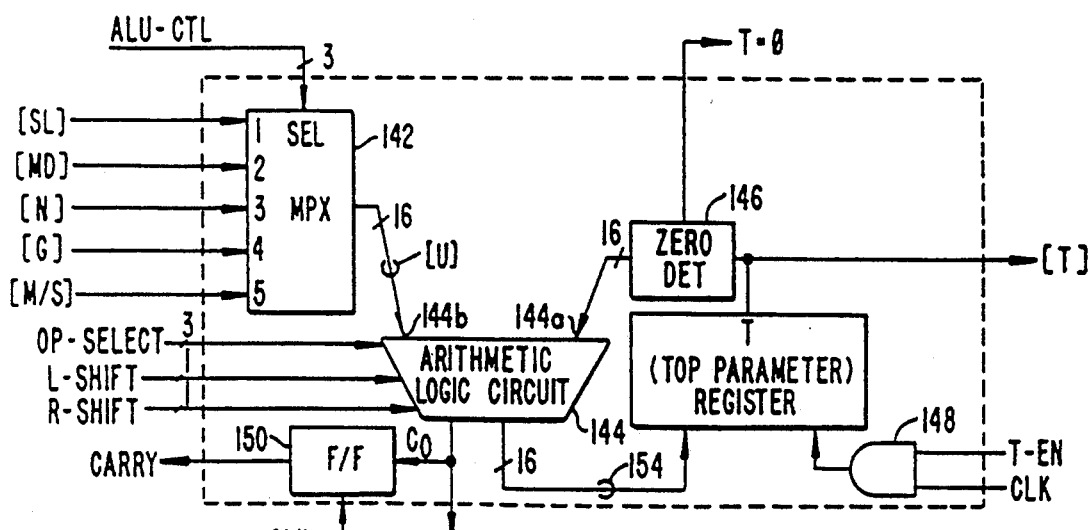
FIG._9.

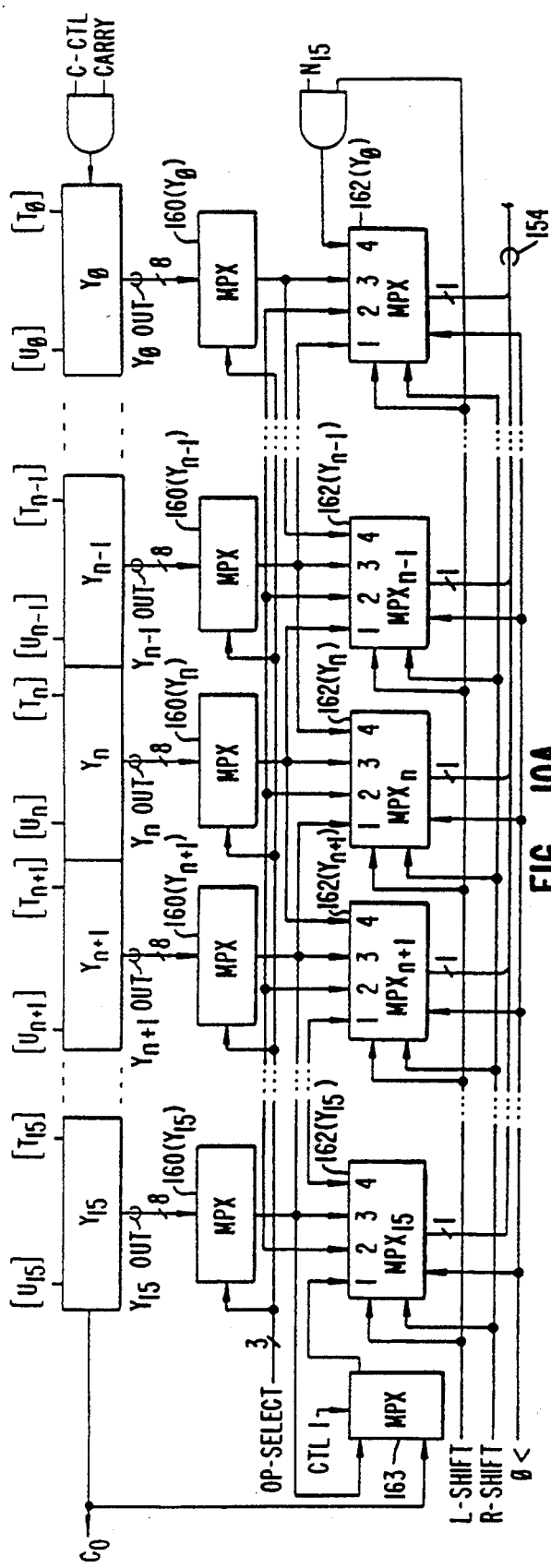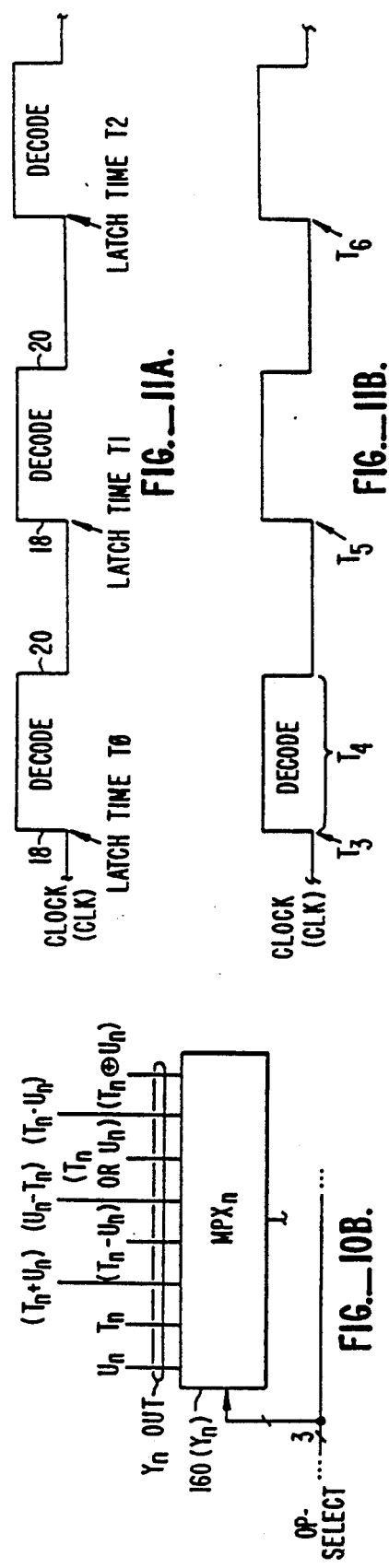

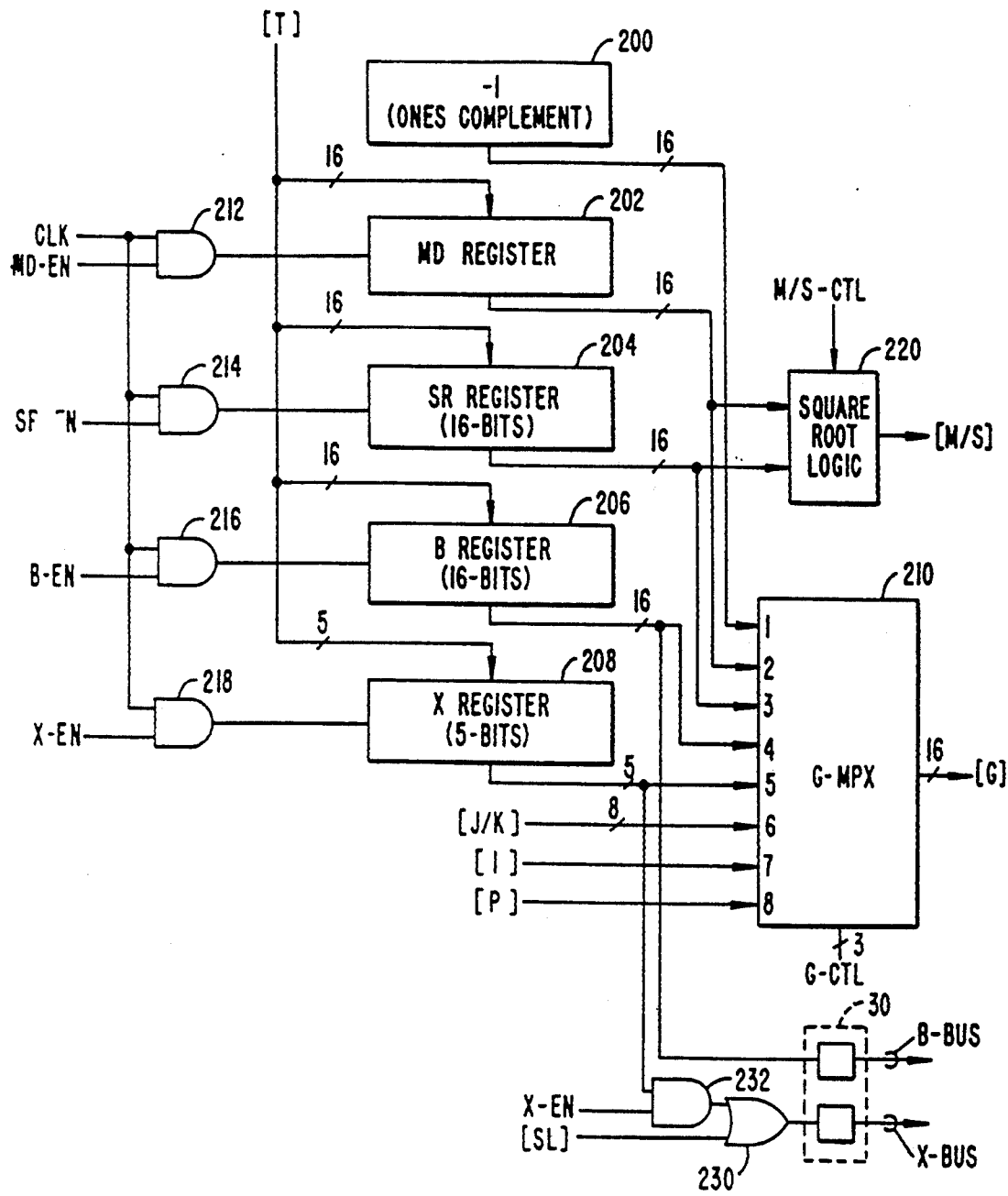
FIG._12.

FORTH SPECIFIC LANGUAGE MICROPROCESSOR

This is a continuation of application Ser. No. 07/336,632, filed Apr. 10, 1989, now U.S. Pat. No. 5,070,451, which was a continuation of application Ser. No. 06/673,694, filed on Nov. 21, 1984 and now abandoned.

BACKGROUND OF THE INVENTION

This invention relates to a microprocessor and specifically to a microprocessor architecture designed to asynchronously execute assembly instructions, one instruction per clock cycle. The microprocessor architecture and assembly instructions are specifically designed to facilitate use of the language known as FORTH.

SUMMARY OF THE PRIOR ART

Computer architecture, including integrated circuit microprocessors, have heretofore been designed with little reference to the programming languages that are ultimately used to operate and control them. To the contrary, prior microprocess or design goals have been to make the architecture of the microprocessor capable of running practically any type of programming language.

The interface between what might be termed a high level programming language, such as COBOL, BASIC, PASCAL, and FORTH, oto name a few, and machine code (the "ones" and "zeros" which are actually applied to the microprocessor) is often the assembly language. Programs written in assembly language have the advantage of often being very fast, efficient, and compact (i.e., the number of machine language instructions used to perform a specific operation is much less than other types of programming). However, programming in assembly language is a tedious, exact, and demanding chore—even for those skilled in such a language. The programmer must often have intimate knowledge of the architecture of the device being programmed—be it computer or microprocessor.

Further, as indicated earlier, the architecture of prior microprocessors has been developed with an eye toward performing as many different tasks or operations as possible; that is, it is often a design goal in microprocessor development to make the microprocessor as "general purpose" as possible. This design goal is usually implemented by incorporating in the design a variety of registers, latches, and other memory elements whose content is often used to qualify, direct, or cause, present or subsequent microprocessor operation.

Such a design approach tends to dictate synchronous operation, requiring multiple (clocked) steps per instruction execution, and some form of internal micro-code. Once the micro-code design is fixed into the microprocessor architecture, it usually cannot be changed without a great deal of difficulty. In addition, this complexity of design places a burden on the programmer: The assembly language programming dictated by the design now requires, in addition to knowledge of the architecture itself, a continuing awareness of the content of such registers, etc., when certain instructions are to be executed. This, in addition to what certain registers, latches, etc., contain before other instructions are to be executed to obtain the results desired.

Moreover, the assembly language used with such integrated microprocessors can be extremely arbitrary, and as such does not provide a relatively easy to learn logical connection that higher-level programming languages typically provide programmers. Further, where mistakes are present in an assembly language program, they are extremely difficult to locate and correct. This difficulty arises from the lack of any logical relation of the assembly language to any computer language. Logical connections between successive assembly language steps are not apparent.

The FORTH implementations on most computers have an additional difficulty. The memory of the computers must be used in three discrete sections. These discrete sections are at least the return stack, the parameter stack, and the main memory. While efforts are made to restrict the specific memory areas, it is common in the FORTH language to cause loops and other overflows to any of the three discrete sections. Overflow to any one section typically writes over the remaining sections of the computer memory. Such over-writes cause memory to be obliterated and the entirety of the computer to "crash". This latter phenomenon causes the information in the computer to be largely useless and usually requires reloading of the entire operating system. Furthermore, it is only with difficulty that the causes of such "crashes" can be precisely located. Typically, the overflow to main memory obliterates or renders inaccessible the programming error which caused the overflow in the first place.

SUMMARY OF THE INVENTION

Accordingly, the present invention discloses a microprocessor architecture specifically designed and constructed to operate in response to an assembly language that is substantially identical to the higher-level FORTH programing language.

Generally, the microprocessor architecture of the present invention is provided with at least three separate, independent input/output ports for communicating data words between the microprocessor and external data elements, one of which can be a memory element for storing instruction words as well as data. A first of the three input/output ports is adopted to be connected to receive instructions. The other two input/output ports are coupled to one another by a two-way data path that includes an arithmetic-logic unit (ALU) for performing a variety of arithmetic and logic operations on data that passes therethrough. The two-way data path allows one of the input/output ports to receive unprocessed data synchronously with receipt of instructions (received at the first port), and pass that data through the ALU to present it, as processed data, at the other input/output port coupled to the ALU.

In the preferred embodiment of the invention a pair of data registers each respectively coupled one of the input/output ports to the ALU in a manner that establishes that aforementioned two-way communication, and each of the input/output ports is coupled to an independent, external memory element, forming a pair of Last In, First Out (LIFO) data stacks for storing a number of sequentially ordered data words. A program counter generates address information that is supplied to a third (main) memory in which are stored microprocessor instructions and data; an address multiplexer selectively communicates the content of the program counter, or the content of certain internal registers of the microprocessor, to an address bus that interconnects the address bus and the main memory. An instruction decode unit receives and decodes instructions accessed from the main memory to provide therefrom the necessary control signals that, via a variety of multiplexing schemes, "pipe" information to desired registers and latches and effect loading of those registers and latches, as dictated by the decoded instruction.

The preferred embodiment of the present invention further includes logic that interconnects the registers and the ALU in a manner that permits one-cycle information "swaps" between any one of the registers and an internal register of the ALU. This feature, together with the two-way data path through the ALU between a pair of input/output data ports, provide a microprocessor architecture uniquely adapted to the design of an assembly language containing the structure and operating characteristics of the FORTH programming language.

Finally, the preferred embodiment of the invention includes addressing circuitry coupled to the external memory elements forming the LIFO stacks of the system in which the microprocessor is used. This addressing circuitry maintain the addresses ("pointers") of (1) the memory locations at which the last data element written to the memory element and (2) the next available memory location at which the next memory element is written. These pointers are automatically incremented or decremented when data is written to (i.e., "pushed onto") or read from ("popped") the stacks, thereby maintaining stack structure without direct intervention of the microprocessor itself.

The stack structure, a concept basic to the structure and operation of FORTH, is utilized extensively by FORTH programming to store "return" from subroutine addresses. FORTH is often referred to as a "building-block" language; using standard FORTH vocabulary words ("primitives"), metawords, meta-metawords, and so on, can be built. Implementation of this (as well as other) concepts require the formation of extensive subroutine programs, many of which are often deeply nested within other subroutines which, in turn, are nested in yet other subroutines. Further, some of these subroutines may even be recursive. In order to be able to return to a point of initiation of a subroutine or subroutines, a return address, usually the address of the memory location containing the next instruction following in succession that which called the subroutine, must be stored. Often, therefore, and particularly in the case of deeply nested subroutines, a successive list of return addresses must be maintained in order to provide a return path. This list is uniquely fitted for storage in one of the LIFO stacks of the system capable of being implemented by the microprocessor of the present invention and an external memory element. Subroutine calls effect an automatic push onto a return stack of the necessary return address.

To complement the aforementioned feature of automatically maintaining a list of return addresses in a "return stack" is the reservation of a specific bit position of the machine language instruction designed for the present invention for use in effecting a return operation without specific memory (or other) manipulation. According to this aspect of the invention, setting this specific bit of the microprocessor instruction to a predetermined state automatically causes the last stored return address to be used to address the main memory (in which instructions are stored) and to "pop" the stack for the next sequential instruction. This feature provides an additional advantage: the last instructions of every subroutine can be an operation (e.g., an arithmetic-logic operation, data transfer, or the like) combined with a subroutine return, merely by setting the "return bit" of any such last instruction to the return or predetermined state.

A number of advantages are obtained from the present invention. First and foremost is the fact that the disclosed architecture is structured so that the assembly language developed therefor implements many of the "primitives" (standard words) of the FORTH programming language. Execution of each primitive (in some cases multiple primitives) requires only one machine cycle; an exception is certain data transfer instructions (fetch and store) which operate in two machine cycles. This allows for compact object code for a given application, and also provides extremely fast execution of that code. These advantages are realized, in part, from the stack constructions and their interconnection with the ALU. The FORTH programming language typically operates from two stacks: A first stack stores parameters which are to be arithmetically and/or logically combined or otherwise manipulated, and a second stack typically used for storing the return addresses—described above. The microprocessor architecture permits use of the stacks by the ALU, permitting greater flexibility by permitting data manipulations to be performed and stored with incredible speed. The requirement of accessing main memory for data storage is reduced automatically.

The ALU includes a register that is used as an output buffer (and, in some cases, also function as an accumulator). The microprocessor of the present invention utilizes this register as the top of one of the aforementioned LIFO stacks (the "parameter" stack). The next location of the stack is also implemented via a register, and the following locations of the stack are found in one of the external memories. The two registers are interconnected so that "SWAPS" can be performed between them; that is, the content of each register is transferred to the other register simultaneous with a reverse transfer, thereby implementing the FORTH "SWAP" primitive. The other stack also has an internal register of the microprocessor coupled to the accumulator of the ALU in a manner that provides this same swap capability.

In addition to receiving a corresponding one of the two aforementioned stacks, the ALU operand inputs are also structured to selectively receive many of the other internal registers of the microprocessor, and thereby perform arithmetic-logic operations on the content.

OTHER OBJECTS, FEATURES AND ADVANTAGES

An object of this invention is to disclose a microprocessor architecture designed specifically to accommodate the FORTH computer language. Accordingly, a microprocessor with four main registers, three main addressing multiplexers, and four input/output ports is disclosed. The registers are each designed to hold a parameter and include a decode register L for operating the microprocessor and a central register T with an appended arithmetic logic unit. The arithmetic logic unit (ALU) connects to a parameter stack through a next parameter register circuit N, and connects to a return stack through an index register circuit I. These connections are made along paths permitting simultaneous swaps of parameters between the T register and the I and N register circuits, for stack pushes and pops to the respective LIFO return memory stacks and LIFO next parameter memory stacks. These latter stacks have simplified counters permitting automatic decrementing and data writing incrementing with appropriate data discharge from the stacks. Addressing of main memory is permitted through a multiplexer which accepts data from the instruction latch L (for absolute jumps); data from the arithmetic logic unit in register T (for fetches and stores of data to memory); data from the index register I (for returns from subroutines); and data from a program counter. There results a microprocessor whose assembly language instructions are performed in one machine cycle with the exception of certain fetches and stores which require two cycles for execution.

A further object of the disclosed microprocessor architecture is to provide service of at least three isolated, separate and discrete memory islands: a main program memory (typically 32K data and program instructions, and 32K additional data) and the return stack and parameter stack (each typically containing 256 addressable memory locations). These discrete memory islands are fast, are served and can be used simultaneously without sequential cycles.

A further advantage of discrete memory spaces is that problems due to overflow can be at least isolated to that discrete portion of memory where the error has been caused to occur. Stack overflow will not invade and overflow main memory. Moreover, where any stack does overflow, there remains the last overflows to provide a programming clue for debugging. Consequently, the programmer can list the main memory and identify bugs causing stack and/or memory overflow, a principle cause of FORTH crashes.

Yet another advantage of this invention is that both the parameter stack and the return stack are available for pop or push and the main memory accessible on a simultaneous basis. Typically, only the speed of the main memory is limiting—the parameter stack and the return stacks are fast and typically do not limit memory access.

Yet an additional advantage of the discrete memory with this microprocessor is that a 48-bit wide path to commonly accessible memory is provided, which path to memory can be three separate 16 bit wide paths, all accessible simultaneously with microprocessor operation.

Yet another advantage of this invention is that the ALU contained within the T register is effectively decoupled from main memory. This arithmetic logic unit runs from parameters on the nearby I and N registers, thereby assuring high speed asynchronous operation.

Yet another advantage of the microprocessor architecture is the memory paths to main memory and the stacks are always active. Shifts in sequential cycles to differing portions of the main memory, return stack, and parameter stack in sequence are not required.

A further object of this invention is to disclose a microprocessor in which so-called "swapping" paths permit the exchange of data between registers. The index register I, the ALU register T and the next parameter register N are interconnected to permit swapping of data from the T register to either the I or N registers. Execution of the FORTH primitives is expedited and in most cases, confined to a single cycle.

An advantage of the registers and their swap path is that the execution of instructions on the microprocessor is essentially asynchronous. Operations can go on between discrete registers on the microprocessor simultaneously and are not required to be cycled sequentially in discrete cycles.

The further advantage is that the architecture positioning of the microprocessor permits a single cycle entry into subroutines, using a single bit (the most significant bit or MSB of the instruction) to define the jump instruction. In addition, all jump instructions include the address to which the jump is made within the instruction itself. Further, the microprocessor architecture permits the jump to be made simultaneous with saving of a return address. An end of cycle instruction is all that is required to do a return from subroutine. A discrete cycle of the microprocessor is not required for a subroutine return.

A further advantage of this invention is to disclose an addressing multiplexer to a main memory which is readily capable of input from a number of internal registers of the microprocessor. According to this aspect, the addressing multiplexer A includes a direct path from instruction latch L for absolute jump, a write and read path to a programming counter P for storing or reading the next program or subroutine step to be executed, a direct path from the indexing register I for placing the next return to the addressing multiplexer, and a direct path from the T register to the addressing multiplexer for two cycle fetches and stores of data from main memory. There results a microprocessor which in a single cycle can set-up the memory location for a future step, latch a memory instruction from main memory for the next step while executing instructions of a current step on an asynchronous basis. Consequently overlap in the execution of microprocessor operation is provided to increase speed.

A further object of this invention is to provide a single cycle jump to subroutine with an accompanying push of the return stack. Accordingly, the program counter P writes its incremented count directly to the return stack in a push. Simultaneously, the address multiplexer receives the next instructed routine direct from the instruction latch L. Single cycle subroutine entry is achieved.

Yet another advantage of the disclosed I or indexing register with the T register is that looping, an extremely common technique in the FORTH and other languages, can occur under control of this register to approximately 65,536 times. Instructions may be repeated. Moreover, stores and fetches to memory can be streamed using a count in the I register and sequences of data, for example a stream of data stored in the next parameter LIFO memory stack; discrete addressing of each data entry is not required.

Yet another object of this invention is to include a microprocessor whose assembler language is directly analogous to and understandable in terms of FORTH.

An advantage of an assembler directly analogous to FORTH is that more than 1,000 man years of programs in FORTH for the public domain are readily available for adaptation to this microprocessor. In short, the microprocessor may be readily programmed with extant programs.

A further advantage of this invention is that many other existent program languages can be implemented in terms of the FORTH program language.

Yet another advantage of the architecture is that the computer language FORTH has been designed first and the architecture of the disclosed microprocessor designed second and conformed to the language known as FORTH. Consequently, the architecture flowing from software design results in a vastly simplified rapidly cycling microprocessor.

Yet another advantage of the assembler being analogous to the FORTH language is that programming in assembler is vastly simplified. This simplification occurs with respect to the level of programming skill required, the time required for programming, and the amount of complexity of the program itself. Consequently providing the microprocessor with an "operating system" can be done with about 1/10 of the time and effort required with traditional assemblers. Moreover, since the assembler language carries with it the words of FORTH, a programmer in reading the listings can follow the logic of the FORTH language to debug or locate errors in the operating system. Consequently debugging time and effort is vastly reduced.

A further advantage of this microprocessor is an operation code which includes a 5-bit short literal at the end of the FORTH primitive instructions. Such short literals can be used for adjustable incrementing and decrementing of registers, especially the T register within the microprocessor. For example, incrementing and decrementing is adjustable with each cycle in a range of 0 to 31. Moreover, the bottom 32 positions of memory can provide faster fetches and stores of commonly used data.

Yet another object of this microprocessor is to disclose a microprocessor architecture in cooperation with the return stack that permits a FORTH dictionary to be lodged having subroutine threaded code. Specifically, a dictionary design is set forth having the word, a link to the next word, and thereafter the series of subroutines to be run to execute the word. No longer is indirect address threading required where the indirect address of the address of a word or subroutine is utilized. This function directly cooperates with the return stack and provides increased speed of execution.

An advantage of the dictionary structure is that it is faster by at least a full cycle in executing each word contained within a FORTH word definition.

Yet another advantage of this invention is to disclose loops and jumps contained wholly within a single instruction. According to this aspect of the invention, jumps include a 12 bit address capable of jumping within an 4K memory "page". A single machine cycle is all that is required for such loop and jump addressing.

Other objects, features, and advantages of this invention will become more apparent after referring to the following specification and attached drawings in which:

BRIEF DESCRIPTION OF THE DRAWINGS

FIG. 1 is a simplified block diagram of the microprocessor of the present invention, illustrating generally the overall information flow of this invention;

FIG. 2 is a map of main memory used within this invention;

FIG. 3 is a block diagram of the instruction decode unit of FIG. 1, illustrating that unit in greater detail;

FIG. 4 is a block diagram of the address multiplexer and program counter of microprocessor of FIG. 1;

FIG. 5 is a block diagram of the I (Return/Index) register circuit of the microprocessor of FIG. 1;

FIG. 6 is a block diagram of the N (Next Parameter) register of the microprocessor of FIG. 1;

FIG. 7 illustrates, in block diagram form, the main memory port of microprocessor FIG. 1;

FIG. 8 is block diagram of one (J) of the stack pointers (J/K) that provide addressing for the external memory units that are used to form the return (R) and parameter (S) stacks used by the microprocessor of FIG. 1;

FIG. 9 illustrates, in block diagram, the arithmetic logic unit (ALU) of the microprocessor of FIG. 1;

FIGS. 10A and 10B illustrate in greater detail, and in block diagram form, multiplexer output portions of the ALU shown in FIGS. 1 and 9;

FIGS. 11A and 11B are timing diagrams of the CLOCK pulse used to operate the microprocessor of FIG. 1; and FIG. 12 is an illustration of additional internal registers of the microprocessor of FIG. 1.

DESCRIPTION OF THE PREFERRED EMBODIMENT

General Description

Turning now to the Figures, and specifically FIG. 1, there is illustrated in block diagram form, and designated with the reference numeral 10, the microprocessor of the present invention. As shown, the microprocessor includes a program counter P for generating addresses that are communicated, via an address multiplexer A, output terminals 15, and an address bus A-BUS, to a main memory 12. As addresses are generated and applied to the main memory 12, instructions, and data words as the case may be, are accessed and coupled to a main memory port M of the microprocessor 10 by a DATA BUS that interconnects the microprocessor 10 with the main memory 12 at I/O terminals 13. Instructions are passed by the main memory port M to an instruction latch L (FIG. 3) contained in an instruction decode unit 14 of the microprocessor 10, and held for decoding.

Instructions that are decoded by the instruction decode unit 14 cause activation of one or more of a number of internal gating and command signals that are dispersed throughout the internal circuitry of the microprocessor 10 to direct information flow and information manipulation within and by the microprocessor.

The microprocessor 10 also receives an externally generated CLOCK signal, illustrated in FIGS. 11A and 11B. From this CLOCK signal is generated an internal clock (CLK) signal that is used to perform various coding and latching operations that will be more fully explained below. It is important at this point to recognize certain overlap operations performed by the instruction decode unit. Instructions are latched in the instruction decode unit 14 on each rising edge 18 (FIG. 11A) of the CLOCK signal, and the latched instruction is decoded during each HIGH state of that signal; instruction decoding is preferably complete by each falling edge 20 of the CLOCK signal. Accordingly, prior to each successive rising edge 18 of the CLOCK signal a determination has been made as to the memory location in the main memory 12 of the next sequential instruction or data word (which, as will be seen, can be obtained from several sources). After instruction decode time is complete, the instruction is executed prior to the next successive rising edge 18 of the CLOCK signal. This allows an overlap of two basic microprocessor operations: Address formation and instruction execution.

These two independent operations take place during each of the periods of the CLOCK signal: the address for the next sequential instruction (or, in the case of data fetches, the data) is formed, and the operation dictated by the instruction is executed. Thus, at latch time T0 (FIG. 11A) at instruction is latched in the instruction decode unit, the location of which has been determined by a previous instruction determination made concomitant with other instruction execution. Similarly, during the time between latch time T0 and latch T1 another address is formed, and applied to the A-BUS while the instruction received at latch time T0 is being executed.

In addition to receiving and passing on to the instruction decode unit 14 instructions words (and, in some cases, addresses), the main memory port M selectively communicates data words to the next parameter register N on a two-way data path 37, structured to permit a simultaneous two-way transfer of data between the main memory port M and the N register circuit. The data received by the main memory port M from the N register circuit, as well as from an arithmetic logic unit (ALU), can be selectively communicated to the main memory 12 for storage.

The N register circuit, in addition to being connected to the main memory port M, is also connected to the ALU by a two-way data path 36, and to an 30 input/output (I/O) port 22. In turn, port 22 is preferably connected to an external parameter memory 24 by a 16-bit S-BUS. The N register circuit, together with the parameter memory 24, form a LAST-IN-FIRST-OUT (LIFO) parameter stack S for storing a one dimensional array of sequential ordered data words. A similar LIFO stack, termed the return stack R, is formed by a return-/index (I) register in conjunction with an external return memory 26. The return memory 26 connects to (16) input-output (I/O) terminals 28 of the microprocessor 10 (to which the I register also is connected) by a sixteen line R-BUS. The return memory 26, like the parameter memory 24, is operated, with the I register, to store data words in a sequentially ordered, one-dimensional array or stack. Entry to the return stack R is via the I register. Entry to the parameter stack S can be through a "top parameter" register T (FIG. 9) via the N register circuit, or through the N register circuit itself as will be described more particularly below. Stack operation is maintained by stack pointers, J/K, that each (the J pointer and the K pointer) respectively produce address signals to the parameter memory 24 and return memory 26. Operation of the parameter and return stacks S and R will be more fully described when the operation of the stack pointers are discussed with respect to Fig. 8.

Finally, the microprocessor 10 includes an input-output PORT 30 comprising twenty-one individual input-/output (I/O) terminals. Five of those terminals connect to an X-BUS, and the remaining sixteen connect to a B-BUS. These twenty-one I/O terminals are associated with, and connected to, an associated 5-bit and 16-bit registers, to provide an additional input/output capability.

Before continuing to a more detailed description of the individual elements that make up the microprocessor 10, a number of important features of the invention can be noted. First is the fact that the microprocessor 10 is capable of communicating with and using four distinct, independent data paths to corresponding I/O terminals 13, 22, 28, and the I/O port 30. While, in the present invention, the main memory 12, parameter memory 24 and return memory 26 are connected to the microprocessor 10 in order to implement an architecture uniquely adapted to a specific programming language, i.e., FORTH, other connections to these terminals can be made to advantageously utilize the microprocessor 10 in different implementations. For example, the microprocessor 10 can.be used for digital signal processing under command of a FORTH language program, wherein the I/O terminals 22 and 28 are adapted to receive data streams indicative of the signals to be processed.

Another important feature of the present invention, particularly when viewed from the FORTH programming language, is the fact that the communicating paths 36, 37, 38, and the G-BUS that respectively connect the ALU to the N and I register circuits, the main memory port M, and the I/O port 30 all provide simultaneous, two-way data transfer, more commonly termed "swaps."

Instruction Decode Unit

Turning now to the circuit implementation of the various elements of microprocessor 10 shown in FIG. 1, FIG. 3 shows the instruction decode unit 14 in greater detail. As illustrated, the instruction decode 14 includes a 16-bit latch 50, an instruction decode circuit 52 and two input AND gates 54, 56, and 58. The 16-bit latch 50 receives at its data input a data word (M) from the main memory port M. The received data word (M) is latched along the rising edge of a CLK signal (derived from and essentially identical to the CLOCK signal received at input terminals 16 of the microprocessor 10) when the enabled clock EN-CLK signal from the instruction decode circuit 52 is HIGH. The EN-CLK signal is usually in its HIGH state except when an instruction dictating iterative operation is being executed. In that case, depending upon the instruction (which will be discussed more fully below), the EN-CLK signal may be LOW for a number of CLOCK signals (and, therefore, CLK signals) to make it appear to the microprocessor 10 as if an equal number (plus 2 as will be described) of identical instructions have been sequentially received, latched, and decoded.

Instructions that are received and latched by the 16-bit latch 50 are applied to the instruction decode circuit 52, where they are decoded. The decoding performed by the instruction decode circuit 52 generates the necessary internal gating and command signals, such as, for example, those listed in FIG. 3 (among others), direct operation of the microprocessor 10.

The instruction decode unit 14 also receives an INT signal, derived from the INTERRUPT signal received at the input terminal 18 of the microprocessor 10, and an RST signal derived from the RESET signal received at the input terminal 20. The INT signal, when HIGH causes the 16-bit latch 50 to be set to a predetermined 16-bit instruction that, in turn, and after decoding, causes an immediate jump to a memory location of the main memory 12 wherein is stored the coding for handling interrupt sequences. The RST signal forces the content of the 16-bit latch 50 to, when decoded, cause another jump to a memory location in the main memory 12 wherein is stored the coding for a reset routine.

In addition to the 16-bit instruction from the latch 50, the instruction decode circuit 52 also receives an I=0 signal from the I register. As will be seen, the I register at times will operate an index register to keep track of the number of iterations performed in response to certain instructions. The I=0 signal notifies the instruction decode circuit 52 when the appropriate number of iterations has been reached so that the next instruction can be accessed from the main memory 12.

The carry out (Co) T=∅ signals are developed by the ALU. The Co signal is indicative of overflow conditions or a negative result, while the T=∅ signal is useful to test for the completion of certain arithmetic operations, as will be discussed below.

Address Multiplexer and Program Counter

Turning now to FIG. 4, there is illustrated in greater detail the address multiplexer A and program counter P, shown in combined form to illustrate their interrelation. As shown, the address multiplexer A comprises a multiplex circuit 60. The program counter P of FIG. 1 comprises a program register 62, a 16-bit adder circuit 64 and a two input AND gate 66.

The multiplex circuit 60 has four, 16-bit, inputs, three of which, 1, 2 and 3, respectively receive the latch 50 output, [L], and output [T] of a T register contained in the ALU (FIG. 9), to the output [I] of the I register (FIG. 5). In addition, the 16-bit input four bf the multiplexer 16 receives the output [P] of the program register 62. Selection between which of the 16-bit inputs is multiplexed to the output of the multiplexer 60 is determined by an A-CTL signal generated by the instruction decode circuit 52 (FIG. 3) and received at the selection SEL input of the multiplexer 60.

The selected input is passed by the multiplexer 60 to one of two operand inputs 66, 68 of a 16-bit adder 64, as well as being communicated to the A-BUS that connects the microprocessor 10 to the appropriate addressing circuitry of the main memory 12 (FIG. 1). The second operand input 70 receives a hard-wired "+1". This arrangement allows the program register to always be loaded with a value, incremented by 1. Thus, for sequential operation, the multiplexer 60 will select the output [P] of the program register 62, reloading the program register 62 with its prior content plus 1.

The program register 62 receives the output of the AND and GATE 66 upon coincidence between the CLK and P-EN signals. The latter signal is generated by the instruction decode circuit 52.

I Register

In addition to the multiplexer circuit 60, the output [P] of the program register 62 is also applied to the I register, which is illustrated in greater detail in FIG. 5. As shown, the I register includes a four input (each 16-bit) multiplex circuit 78, the output of which is applied to the data inputs of a register 80. Selection of which of the inputs 1-4 of the multiplex circuit 68 is coupled to the register 80 is made by the I-CTL signal received at the selection (SEL) input of the multiplexer.

The 16-bit output [I] of the register 80 is coupled, via a zero test circuit 82 to one (16-bit) operand input of a 16-bit adder 84. The other operand input of the adder 84 receives a "1". The combination of the register 80, zero test circuit 82, and adder 84, together with the feedback path provided by the multiplexer circuit 78, provide a technique whereby the content of the register 80 can be incrementally decreased (decremented), testing each decrement for zero. This allows the I register circuit (i.e., register 80) to be used as an index register to count a number of iterative steps of microprocessor operation (such as, for example, during execution of multiply instructions), and provides a means for testing for an end to those iterative steps.

The output [I] of the register 80 is coupled to a tri-state buffer, and from there to the I/O terminals 28 that connect the microprocessor 10 to the R-BUS. An R-ENABLE signal selectively communicates the register 80 output [I] to the I/O terminals 28 when in one state, i.e., HIGH; and disconnects the register from the I/O terminals 28 by placing the output of the tri-state buffer 86 in a high impedance state when LOW.

The I/O terminals 28 are also connected to a receiver circuit 88 that couple the I/O terminals 28 to an input of the multiplexer circuit 78. The combination of the tri-state buffer 86 and receiver circuit 88 provide two-way communication between the I register circuit and the return memory 26 (FIG. 1) via the R-BUS.

The content of the register 80 is determined by various instructions. Accordingly, it is the I-CTL and I-LD that determine what is placed in the register 80 and when.

N-Register Circuit

The detail of the N (next parameter) register circuit is illustrated in FIG. 6. As shown, the N register circuit includes a five (16-bit) input multiplex circuit 96, a register 98, and a AND gate 100. The multiplex circuit 96 receives at its (16-bit) inputs 1 and 2 the output [T] from the T register of the ALU (FIG. 9), the output [M] from the main memory port M (FIG. 7) at the (16-bit) inputs 3 and of the multiplexer 96 and receive the output of the register 98—but in special fashion. As will be seen, the register 98 can be configured by certain of the arithmetic instructions as the lower sixteen bits of a 32-bit register formed by register 98 and the T register of the ALU. When so configured, the register combination is capable of being shifted either left or right. When shifted left, the lower sixteen bits receive, at the LSB position, the CARRY signal generated by the ALU (FIG. 9); when being shifted right the MSB of the register 98 receives the LSB of the T register (T$_∅$). The feedback path through the multiplexer 96 performs this shift operation. Input 4 of the multiplexer 96, when selected, multiplexes the low-order fifteen bits (i.e., LSB$_∅$-MSB$_{-1}$) of the register 98 to the input of that register so that, when loaded, the effect is a 1-bit shift left. At the same time, the CARRY signal is combined with the fifteen output lines from register 98 at the input 4 of the multiplexer 96 so that the LSB receives the CARRY signal. In similar fashion, the high-order fifteen bits (MSB-LSB$_{+1}$) are combined with the LSB (T$_∅$) of the output [T] at the input 3 of the multiplexer 96 to effect a 1-bit right shift of the content of the register 98, with the LSB of the output [T] shifted into the MSB position.

Loading is effected by coincidence, at the two inputs of the AND gate 100, between the CLK signal and the control original N-LD signal produced by the instruction decode circuit 52 (FIG. 3). Selection of which of the multiplexer inputs 1-5 will be applied to the register 98 is effected by the control signal N-CTL also produced by the instruction decode circuit 52.

The 16-bit output [N] of the N register circuit from register 98 is coupled to the S-BUS by a tri-state device 99 when the control signal S-ENABLE is active. Data may be coupled to the register 98 from the S-BUS via the receiver 101 and the multiplexer 96.

Main Memory Port M

As indicated during the discussion of FIG. 1, instructions and data are received or transmitted by the microprocessor 10 via the main memory port M. Illustrated in FIG. 7, in greater detail, is the main memory port M, which is shown as including a two (16-bit) input multiplexer 110, a (16-bit) tri-state device 112, and a receiver-buffer 114. The multiplexer circuit 110 receives two (16-bit) outputs: [IN] from the N register circuit (FIG. 6) and [T] from the T register of the ALU (FIG. 9). The multiplexed quantity (i.e., [N] or [T]), selected by the control signal M-CTL is passed by the multiplexer 110 to the tri-state device 112 and from there to the I/O terminals 13 for communication via the DATA BUS to main memory 12. In addition, the output of the tri-state 112 (as well as the I/O terminals 13) is made available to the internal circuitry of the microprocessor 10 as the output [M] of the main memory port M by the buffer circuitry 114. Thus, the output [M] of the main memory port M represents either (1) the selected one of the N register circuit output [N] or T register [T] or (2) data from the main memory 12, depending on whether or not the tri-state device is in its transmitting or high impedance state, respectively. Control of the tri-state device 112 is effected by a selection signal M-SEL generated by the instruction decode unit 14.

Stack Pointers J and K

As previously indicated, maintenance of the parameter and return stacks S and R is conducted, in part, by the stack pointers J and K—under at least partial control of control signals from the instruction decode unit 14. The stack pointers J and K function to generate the address signals that are applied to the parameter memory 24 and return memory 26 for reading and writing from or to the stacks as necessary. They keep track of the last memory location written (and, therefore, is the location of the data that is accessed if the stack is read or "popped"), and have ready the address of the next empty memory location to which data will be written when a "push" is implemented. Each stack pointer J and K generates two 8-bit addresses, and the structure of each is essentially identical. Accordingly, only the stack pointer J will be described in detail, it being understood that the discussion applies with equal force to the stack pointer K unless otherwise noted.

Referring, therefore, to FIG. 8, there is illustrated in greater detail the stack pointer J used for addressing the return memory 26. As shown, the stack pointer J includes three two input, 8-bit multiplexers 120, 122, and 124, two 8-bit latches 126 and 128, and an output multiplexer 130. The latches 126 and 128 are each respectively caused to be loaded by signals generated by the AND gates 132 and 134. Loading of the 8-bit latch 126 is enabled by the J1-EN signal produced by the instruction decode unit 14, together with the CLK signal, while the 8-bit latch 128 is loaded by presence of the J2-EN enable signal and the CLK signal.

A feedback path for the output 8-bit latch 126 to the input 2 of the multiplexer 120 is provided by a decrement circuit 136, which receives the output of the 8-bit latch 126, subtracts "1" from that output, and supplies the decremented value to the input 2 of the multiplexer 120. In similar fashion, an increment circuit 138 receives the output of the 8-bit latch 128, increases it by 1, and provides the increased value to the input 1 of the multiplexer 122. The outputs of the 8-bit latches 126 and 128 are also communicated to the JA bus (which connects the stack pointer J to the return memory 26) by a multiplexer 130.

As previously indicated, the stack pointer J is responsible for generating two addresses: The first "points" to the memory location of the return memory 26 at which the last quantity has been stored; the second points to the memory location at which the next value will be written. It is the function of the 8-bit latches 126 and 128 to always retain these respective pointers. As constructed, the content of the 8-bit latches will always be one address apart; that is, the content of the 8-bit latch 128 will be one greater than that of the 8-bit latch 126; the content of the 8-bit latch 126 points to the "last written" memory location and the 8-bit latch 128 points to the next available location.

The 8-bit latch 126 is presettable with the low-order eight bits from the output [T] of the T register (FIG. 9). The high-order eight bits of [T] preset the 8-bit latch (not shown) of the stack pointer K corresponding to latch 126. The 8-bit latch 128 (and its counterpart in the stack pointer K) are not preset and are, therefore, indeterminant until a data read. When such a read operation occurs, the content of latch 28 is loaded with the read address, and the latch 126 is loaded with the read address minus one.

The parameter and return stacks S and R, respectively, are operated in conventional fashion; that is, data is either "pushed" (written) onto or "popped" (read) from the stacks. A push is implemented by writing into the next available memory location the desired data and incrementing the 8-bit latches 126, 228; a pop is effected by reading the last value written and decrementing the 8-bit latches 126, 128. In actual operation of the parameter and return stacks S and R, the pop and push operation utilize the N register circuit or the I register circuit, which respectively form the top of the stacks. The following discussion concerns operation of the the return memory 26 by the stack pointer J.

Consider first a "push" operation in which the output of the I register circuit [I] is to be added the remaining portion of the return stack R, (i.e., that portion of the return stacks implemented by the return memory 26. The memory location at which the content of the I register is to be placed can be found by the content of the 8-bit latch 128. Accordingly, the instruction decode unit 14 brings HIGH a WRITE signal which causes the multiplexer 130 to select the output of the 8-bit latch 128, which output is applied to the address circuitry via the JA bus, of the return memory 26. At the same time, the WRITE signal causes 35 the multiplexer 122 to select its input I for application to the data input of the 8-bit latch 128, and causes the multiplexer 120 to select its input 1 for application to the input 2 of the multiplexer 124. During this time, the READ signal is low, causing the multiplexer 124 to communicate its input 2 to the 8-bit latch 126. Thus, it can be seen from the FIG. 8 when the WRITE signal is high, the multiplexers 120, 122, and 124 cause (1) the content of the 8-bit latch 128 plus 1 to be applied to the data inputs of that latch; (2) the content of the 8-bit latch 128 to be applied to the data inputs of the 8-bit latch 126; and (3) the content of the 8-bit latch 128 to be applied to the memory circuits of, the return memory 26. The J1-EN and J2-EN signals are brought HIGH by the instruction decode unit 14 so that the pointers contained by the 8-bit latches 126, 128 are incremented by 1 while the desired value is written to the memory, at CLK time.

The data is "popped" from the return memory into the I register in the following manner: the READ signal is brought HIGH, and the WRITE signal is kept LOW, by the instruction decode unit 14. With WRITE 20 HIGH and READ LOW, the multiplexers 120 and 124 each have selected their inputs too, thereby returning the content of the 8-bit latch 126 −1, to its data inputs; and the multiplexer 122 selects its input to communicate the content of the 8-bit latch 126 to the 8-bit latch 128. The multiplexer 130 selects its input and applies the content of the 8-bit latch 126 to the memory circuits (not shown) of the return memory 26. Upon appearance of the next successive CLK pulse (assuming appropriate command signals from the instruction decode unit, i.e.,. J1-EN, J2-EN HIGH, the address pointers contained by the 8-bit latches 126 and 128 are decremented. Note that this pop operation will be accompanied by the necessary control signals, generated by the instruction decode unit 14, to cause the register 80 (FIG. 5) to receive and retain the data sitting on the R-BUS from the return memory 26; that is, the I-CTL signal selects the input 3 of multiplexer 78, the I-LD signal is HIGH and the R-ENABLE signal places the tri-state device 86 in its high impedance state so that upon arrival of the CLK signal that decrements the J stack pointer, the register 80 will also be loaded with the "popped" quantity.

ALU and T Register

Shown in FIG. 9, in greater detail, is the ALU of the microprocessor 10. FIGS. 10A and 10B show, in greater detail, portions of the heart of the ALU, the arithmetic logic circuit 110. Referring first to FIG. 9, the ALU is shown as including a four-input multiplexer 142, the arithmetic logic circuit 144, the previously mentioned T (top of parameter) register, a zero detect circuit 146, an AND gate 148, which produces (from a T-EN signal from the instruction decode unit 14 and the CLK signal) a load signal for the T REGISTER, and a carry flip-flop 150. The arithmetic logic circuit 144 is, in essence, a 16-bit design that is provided with two operand inputs 144a and 144b that respectively receive the outputs [T] and [U] from the T register (via the zero detect circuit 146) and the multiplexer 142, providing the sum of [T] and [U], the difference of [T] and [U], the difference of [U] and [T], [T] itself, [U] itself, the logical [T] OR [U], the logical [T] AND [U], or the logical [T] EXCLUSIVE-OR [U].

The output of the arithmetic logic circuit is coupled to the inputs of the T register by a bus line 154, which communicates the result of the arithmetic or logic operation performed on the values received at the operand inputs 144a, 144b of the arithmetic logic circuit 144.

The arithmetic logic circuit 144 also receives OP-SELECT, which result (identified above) is to be communicated to the bus 154 and L-SHIFT and R-SHIFT which function to perform left and right 1-bit shifts of the results for reasons that will be made clearer below.

In general, therefore, the ALU receives four quantities: [SL] from the instruction decode unit 14 (FIG. 3), the output [MD] from the register multiply/divide 202 (FIG. 12), the output [N] from the N register circuit (FIG. 6), and output [G] from a variety of internal registers (FIG. 9), which will be described more fully below. Note that it is the multiplexer 142 that establishes, via the arithmetic logic circuit 144 a 16-bit wide communication path from either the I register or the N register circuit to the T register. Note also that the output [T] of the T register is communicated to both the I register and the N register. On appropriate signals from the instruction decode unit 14, information from the parameter stack S, including the N register circuit, can be sequentially supplied to the T register, or alternatively, information from the return stack R, via the I register can be communicated to the T register. Note particularly the fact that this data path allows information stored in the parameter memory 24 to be transferred to the return memory 26 and vice versa, as needed. Note further still that the swap paths designated as 36 and 38 in FIG. 1 are established by multiplexers 142 and multiplexer 96 (for the swap path 36) and multiplexer 78 (for the swap path 38).

As will be seen, certain of the instructions test the content of the T register for "zero" to determine whether to continue operation or select another instruction option. Accordingly, the (16-bit) data path from the T register to the arithmetic logic circuit 144 of the ALU includes a zero detect circuit 146 that issues a "T=∅" when the output [T] is a ∅. As illustrated in FIG. 3, the T=∅ is an input to the instruction decode circuit 52 of the instruction decode unit 14.

The arithmetic logic circuit 144 is illustrated in greater detail in FIG. 10A. As illustrated, the arithmetic logic unit includes sixteen interconnected stages, each stage structured in a manner known to those skilled in the art to produce the necessary arithmetic and/or logical signals indicative of an arithmetic logic circuit. Thus, for example, as illustrated in FIG. 10B, the individual arithmetic-logic stage $Y_n$ produces, from its operand inputs $[U_n]$ and $[T_n]$ (together with any carry from the immediately lower stage, $Y_{n-1}$) the terms $U_n$, $T_n$, $(T_n+U_n)$, $(T_n-U_n)$, $(U_n-T_n)$, $(T_n$ OR $U_n)$, $(T_n$ AND $U_n)$, and $(T_n$ EXCLUSIVE-OR $U_n)$. These outputs of each of the stages $Y_\emptyset \ldots Y_{15}$ are applied to corresponding multiplexers $160(Y_{5\emptyset18}) \ldots 160(Y_{15})$, respectively. Each of the output multiplexers $160(Y_\emptyset) \ldots 160(Y_{15})$ receive a 3-bit bus that carries a selection signal OP-SELECT. The OP-SELECT signal is generated by the instruction decode unit 14 in response to a decoded instruction that dictates which of the terms are going to be selected.

Referring again to FIG. 10A, the output of each of the multiplexers $160(Y_\emptyset)$–$160(Y_{15})$ are each supplied to yet another corresponding multiplexer $162(Y_\emptyset)$–$162(Y_{15})$. In addition, the output lines of each of the multiplexers $160(Y_1)$–$160(Y_{14})$ are connected to the multiplexers of the bit positions immediately below and above. Thus, for example, the output line from the multiplexer $160(Y_n)$, in addition to being applied to the input 2 of its associated multiplexer $162(Y_n)$, is also applied to input 1 of multiplexer $162(Y_{n-1})$ and input 3 of multiplexer $162(Y_{n+1})$. The multiplexers for the arithmetic-logic stages $Y_\emptyset$ and $Y_{15}$ are different only in that the multiplexer $162(Y_\emptyset)$ receives at input 3 the carry-in $(C_i)$, and the multiplexer $162(Y_{15})$ receives at input 1 the output of a multiplexer 164, which selects one of four available signals: the output of the multiplexer $160(Y_{15})$, CARRY, LSB from the N register, $N_\emptyset$, or a "zero sign". Selection of which signal is coupled to the input 1 of the multiplexer $162(Y_{15})$ is made by the CTL ONE signal generated by the instruction decode unit 14 (FIG. 3).

The multiplexers $162(Y_\emptyset)$–$162(Y_{15})$ function to perform 1-bit left shifts, 1-bit right shifts, or no shift upon the result from the arithmetic-logic stages $Y_\emptyset$–$Y_{15}$. In addition, multiplexers function to propagate the sign bit (i.e., the MSB) throughout the T register. A 1-bit left shift operation is performed when the signal L-SHIFT, generated by the instruction decode unit 14, is HIGH (the R-SHIFT signal being kept LOW), with a carry $(C_i)$ being shifted into the LSB position; a right shift operation is performed when the R-SHIFT is HIGH (and the L-SHIFT signal is LOW), with either the output of the multiplexer $160(Y_{15})$, the CARRY signal from the flip-flop 150 (FIG. 9), the LSB of the N-register, $N_\phi$, or a "zero" being the putative output of the stage $Y_{15}$; or, when both of the L-SHIFT and R-SHIFT signals are LOW, the outputs of the multiplexers $160(Y_\phi)$-$160(Y_{15})$ are passed by the corresponding multiplexers $162(Y_\phi)$-$162(Y_{15})$. The selected results are received by the bus line 154 and communicated to the T register (FIG. 9).

Sign bit propagation is effected by being HIGH the $\phi<$ signal. This causes the multiplexers $162(Y_\phi)$-$162(Y_{15})$ to communicate their input 2 to the bus line 154. The input 2 of each multiplexer $162(Y_\phi)$-$162(Y_{15})$ receives the MSB bit passed by the multiplexer $160(Y_{15})$.

Other Internal Registers

The microprocessor 10 incorporates other registers, together with a two-way communication "swap" path (via the multiplexer 142) to the ALU. These registers are shown in FIG. 12, and include the multiply/divide (MD) register 214, the square root (SR) register 204, the B register 206, and the X register 208—all presettable from the output [T] of the T register. The outputs of these registers are selectively communicated to the ALU via the G multiplexer 210.

FIG. 12 also discloses a square root logic circuit 220 which receives the outputs of the MD and SR registers to provide (as the 16-bit signal [M/S]) the logical OR of the content of the SR register 204 content, shifted by 2, with the content of the MD register 202.

Instruction Set

Having now described the circuitry of the microprocessor 10, the instruction set will be explained and discussed with respect to Tables I-XIV.

The instructions can be, generally, grouped in four categories: (1) the Arithmetic group includes those instructions of groups I and II include those instructions that performed arithmetic operations; (2) the Jump group includes those instructions which provide for conditional or absolute program jumps; (3) the Indexing instructions are basically "set up" instructions or instructions that effect iterative operations; and (4) the Data Fetch/Store instructions which transfer information between various memory spaces, registers, and the like.

As will be seen, the mnemonics used for each instruction, as well as its operation, utilizes the FORTH programming language and concepts as much as possible.

Arithmetic Instructions

Tables I and II set forth those instructions used to cause the microprocessor 10 (FIG. 1), and in particular its ALU (FIGS. 9, 10A and 10B) to perform arithmetic operations.

TABLE I

| ARITHMETIC INSTRUCTIONS | | |
|---|---|---|
| OP CODE (OCTAL) | INSTRUCTION MNEMONIC | ACTION |
| 100000 | NO OP | No Operation |
| 107020 | DROP | Pop N into T |
| 107000 | DROP DUP | Copy N into T |
| 107120 | DUP | Push T into N |
| 107120 | OVER | Copy N into T while pushing T into N |
| 107100 | SWAP | Exchange N and T |
| 104020 | + | Add N to T and pop N |
| 102420 | +c | Add N to T with carry and pop N |
| 106020 | − | Subtract T from N and pop N |
| 106420 | −c | Subtract T from N with carry and pop N |
| 102020 | SWAP − | Subtract N from T and pop N |
| 102420 | SWAP −c | Subtract N from T with carry and pop N |
| 103020 | OR | Logically OR N into T and pop N |
| 105020 | XOR | Logically XOR N into T and pop N |
| 101020 | AND | Logically AND N into T and pop N |
| 100001 | 2/ | Shift T right one bit with $N_\phi$ into $T_{15}$ |
| 100002 | 2* | Shift T left one bit with $N_{15}$ into $T_\phi$ |
| 100003 | 0< | Propagate sign of T through T |
| 100011 | D2/ | Shift the combination of N and T left one bit |
| 100012 | D2* | Shift the combination of N and T right one bit |
| 104211 | *' | Multiply step |
| 102211 | *− | Signed multiply step |
| 102212 | *F | Fractional multiply step |
| 102216 | /' | Divide step |
| 102214 | /" | Last divide step |
| 102616 | S' | Square root step |

Referring first to Table I, illustrated there are the operation code, mnemonic, and a brief description of the operation or action for each of the basic arithmetic instructions; the more complex arithmetic instructions, i.e., those instructions that can perform multiple operations in one machine cycle.

The first few instructions will be described in terms of the circuitry illustrated in FIGS. 1-13 in order to provide a clear understanding of not only the execution of an instruction, but the operation of the circuitries itself and, in effect, the coding necessary to be set into the instruction decode circuit 52 (FIG. 3) to activate the necessary control signals (such as those shown in connection with FIG. 3) in response to the op code bit structure of the instruction.

Thus, now referring to FIG. 1, the no operation (NO OP) instruction does just that: it performs no operation whatsoever; it is a "null" instruction. The DROP instruction causes the content of the N register, i.e., the register 98 (FIG. 6) to be transferred via the multiplexer 142, arithmetic-logic circuit 144 (the multiplexers 160 and 162). The instruction decode circuit 52, therefore, sets up the appropriate data path via the control signals ALU-CTL, OP-SELECT, L-SHIFT, R-SHIFT, and T-ENABLE. As an illustration of the timing of this (and any other) instruction, assume that the instruction was latched in the instruction latch 50 at time $T_\phi$ (FIG. 12). During the DECODE time indicated in FIG. 12, the instruction decode 52 perceives the instruction from the instruction latch 50, decodes that instruction, and sets up the appropriate data path to the T register by activating the necessary aforementioned gating and command signals. At time $T_1$, when the next instruction is to be latched into the instruction latch 50, the CLK signal (together with T-EN via the AND gate 48) causes the transferred information to be set in the T register.

The DROP instruction also "pops" the parameter stack S. Accordingly, the internal gating and command signals issued from the instruction decode circuit 52 cause the memory location designated (at the time of execution of the DROP instruction) by the gate bit latch of the stack pointer K (not shown) that corresponds to the 8-bit latch 128 of the stack pointer J (FIG. 8) to be conducted via the multiplexer 196 to the register 98 and loaded therein at the next rising edge of the CLK signal, i.e., at time $T_1$ of the above described example.

DROP DUP instruction instruction is essentially the same as the DROP instruction except that the parameter stack is not popped. Thus, at the completion of the DROP DUP instruction, the content of the N register is identical to that of the T register.

The DUP instruction "pushes" the content of the T register onto the parameter stack S. Thus, execution of this instruction requires the input 1 of the multiplexer 96 (FIG. 6) to select the output [T] of the T register for communication to the register 98. The output [N] since on the I/O terminals 22 and, therefore, is communicated to the parameter memory 24 (FIG. 1) of the S-BUS. At the next CLOCK signal (and the CLK signal derived therefrom) the content of the T register is loaded into the N register, at the same time the (prior) content of the N register is, loaded into the parameter memory 24 at the memory location designated by the K stack pointer counterpart of the 8-bit latch 128, and the 8-bit latches (not shown) of the stack pointer K incremented by 1.

The OVER instruction utilizes the two-way communication 36 illustrated in FIG. 1 between the T register of the ALU and the N register. Assume, for the purposes of illustrating this instruction, that just after time $T_\emptyset$ (FIG. 12) the content of the T register is $T(\emptyset)$, and the content of the N register is $N(\emptyset)$. Just after the time $T_1$ (FIG. 12) the content of the T register will be $N(\emptyset)$, the content of the N register will be $T(\emptyset)$ and the memory location of the top of that portion of the parameter stack S contained in the parameter memory 24 will contain $N(\emptyset)$. This instruction requires the necessary internal gating and command signals to be issued by the instruction decode circuit 52 to cause the multiplexer 96 (FIG. 6) to select the output [T] from the T register, the multiplexer 142 (and arithmetic-logic circuit 144) to select and communicate the output [N] of the N register to be communicated to the T register, and to cause an appropriate read command (not shown) to be communicated to the parameter stack memory 24 to load the necessary registers and memory.

The SWAP instruction also utilizes the simultaneous two-way data path 36, and causes the multiplexer 142 and arithmetic-logic circuit 144 to communicate the output [N] of the N register to the T register at the same time that the output [T] of the T register is communicated via the multiplexer 96 to the register 98 of the N register. The effect is to "swap" or exchange the respective contents of the N and T registers.

The + instruction adds the content of the N and T registers, leaving the result in the T register, and "pops" the parameter stack S into the N register; the 8-bit registers (not shown) of the stack pointer K, corresponding to those of the stack pointer J (FIG. 8) are each decremented by 1.

The +c instruction utilizes the CARRY signal from the flip-flop 150 of the ALU (FIG. 9). The CARRY signal is gated to the $C_i$ input of the ALU so that the operation of adding the content of the N register to the content of the T register together with any carry from a previous instruction is performed, and the parameter stack S popped.

The − instruction is the same as the + instruction except that it is a subtraction operation that is performed, and the content of the T register is subtracted from the N register. It may be appropriate at time time to point out again that each individual stage $Y_\emptyset$-$Y_{15}$ performs all necessary arithmetic (i.e., add and subtract) operations so that at the output of each stage are the operations as indicated previously and in FIG. 10B. A particular operation is selected by the OP-SELECT signal generated by the instruction decode circuit 52 of the instruction decode unit 14. Thus, for the arithmetic-logic stage $Y_n$ outputs illustrated in FIG. 10B, the + instruction would cause the OP-SELECT signal to be of a predetermined state to cause the multiplexer 160($Y_n$) to select the term $(T_n+U_n)$ for passage to the second multiplexer 162 ($Y_n$) (FIG. 10A). Of course, the U operand is, in fact, the output [N] from the N register circuit via the multiplexer 142 (FIG. 9). In similar fashion, the − sign instruction would select, via generation of the OP-SELECT signal the $(U_n-T_n)$.

The −c is, as indicated in TABLE I, an operation that subtracts the content of the T register from the N register circuit (i.e., register 98) and any carry, the result being left in the T register. The parameter stack S is popped.

The SWAP− and SWAP−c are, in effect, the same as the − and −c instructions, described above, except that the result is obtained by subtracting the [U] operand from the content of the T register. Referring to FIG. 10B, the OP-SELECT signal will cause the multiplexer 160 ($Y_n$), as well as the other multiplexers 160.

The OR, XOR, and AND perform the logical operations indicated, causing the necessary multiplexer selections to be made through the internal gating and command signals generated by the instruction decode unit 14.

The 2/ and 2* performs right and left shift operations, utilizing the multiplexers 162 (FIG. 10A). The 2/ instruction activates the R-SHIFT and CTL1 signals so that each of the multiplexers 162($Y_{14}$)-162($Y_\emptyset$) to select its corresponding input 1. The MSB multiplexer, 162($Y_{15}$), receives at its input 1 the $N_\emptyset$ from the multiplexer 163. The 2* instruction activates the L-SHIFT and C-CTL signals to operate the multiplexers 162($Y_\emptyset$)-162($Y_{15}$) and 165 to effectively shift the content of the T register one bit to the left, with the MSB, $N_{15}$ of the N register being shifted into the LSB position of the N register.

The $\emptyset<$ instruction functions to propagate the sign (i.e., the MSB) through the T register.

The D2/ and D2* instructions perform left and right 1-bit shifts of both the N and T registers as if there were combined 32-bit register with the T register forming the upper-most-significant sixteen bits. The left and right shifts of the T register are performed as described above with respect to the 2/ and 2* instructions. The shift of the N register is performed using the multiplexer 96 and feedback path from register 98. If a left shift is performed, the input 4 of the multiplexer 96 is selected by the N-CTL signal, effecting a 1-bit left shift of the content of the register 98, the CARRY being shifted into the LSB position. If a right shift is effected, the N-CTL signal affects selection of input 3 (at which the low-order fifteen bit positions of register 98 are communicated to the register 98 as the high-order fifteen bit positions combined with the $T_\emptyset$ as the LSB).

The *!, *-, and *F multiply instructions utilize the T and N registers (FIGS. 6 and 9) together with the multiply/divide (MD) register 202 (FIG. 12). Before these instructions are used, however, data transfer instructions (discussed below) put the multiplier in the MD register 202, the multiplicand in the N register, and the T register is cleared. Execution of the multiply instruction, *!, causes the MD register 202 to be communicated, via the multiplexer 142 of the ALU 14 (where it appears as the input [MD]), and is applied to the arithmetic-logic circuitry 144 as the operand input [U] and added to the content of the T, if the LSB, $N_{5\text{lB}}$, of the N register is a "1". Simultaneously with the prior described set up, the T and N registers are loaded with their content shifted one bit left.

The operation for the signed multiply step, *-, is identical, except that the content of the MD register 202 is subtracted from that of the T register if $N_\emptyset$ is a "1". The fractional multiply step, *F, is identical to the signed multiply step, except that a left shift is performed.

The divide step, /, subtracts the content of the MD register from that of the T register. If the result of that subtraction is negative (which would be indicated by a carry from the arithmetic-logic circuit), the result is discarded, and the 32-bit combination formed by the T and N registers is shifted left one bit, with the CARRY signal being shifted into the LSB position of the N register. If the result is not negative, it is loaded, shifted one bit left, into the T register (along with the shift of the N register).

The multiply and divide steps are performed only once when encountered. Iterative operations utilize the TIMES indexing instruction (TABLE - IV) in a manner that will be described below, and in conjunction with the I register. The divide operation, however, requires special handling for the last step of the process and, therefore, there is provided the last divide step instruction, /". This instruction is essentially identical to the divide step instruction, /, except that execution does not terminate with any shift of the T register; only the N register is shifted one bit.

TABLE II

| ARITHMETIC INSTRUCTIONS (COMBINED) | | |
|---|---|---|
| OP CODE (OCTAL) | INSTRUCTION MNEMONIC | ACTION |
| 104000 | OVER + | N + T; result in T; no stack operation |
| 104400 | OVER $+_c$ | N + T + carry; result in T; no stack operation |
| 102000 | OVER − | N − T; result in T |
| 102400 | OVER $-_c$ | N − T − carry; result in T |
| 106000 | OVER SWAP − | T − N |
| 106400 | OVER SWAP $-_c$ | T − N − carry |
| 103000 | OVER OR | T OR N |
| 105000 | OVER XOR | T XOR N |
| 101000 | OVER AND | T AND N |

The combined arithmetics instructions of TABLE II, above, are essentially identical to those discussed with respect to TABLE I except that, due to the design, certain instructions can be combined to be performed in one block cycle. Thus, for example, the OVER + combines the OVER and + instructions of TABLE I to cause the content of the registers N and T to be added and loaded into T. The content of the N register and remainder of the parameter stack S remain unchanged. Similarly, the OVER and +c adds the content of the N register to that of the T register with any carry, the result being retained by the T register. Again, the parameter stack S, including the content of the N register, are left undisturbed.

Jump Instructions

Jumps from one memory location to another, primarily from subroutine calls and returns, which can often be deeply nested, are indigenous to the FORTH language. The microprocessor 10 of the present invention, together with the return stack R provides an optimised device for executing such memory jumps. TABLE III, below, lists the operation codes, mnemonics, and action taken for each of the five jump instructions.

TABLE III

| | JUMPS | |
|---|---|---|
| OP CODE (OCTAL) | INSTRUCTION MNEMONIC | ACTION |
| 0aaaaa | :word | Absolute Jump To Subroutine |
| 11aaaa | IF | Jump if T=$\emptyset$ |
| 13aaaa | ELSE | Unconditional jump |
| 12aaaa | − LOOP | Jump if I$\neq\emptyset$; decrement I |
| 0xxx4x | ; | Return |

The first four instructions, the :word, IF, ELSE, and - LOOP, all have the address of the memory location of main memory 12 to which the jump will occur embedded in the instruction itself (indicated, in the op code as aa..a).

Referring first to the :word instruction, two operations are required to be performed since this is a jump to a subroutine. First, the return path must be established; and, second, the jump address must be placed on the A-BUS to address the main memory 12 (FIG. 1). Thus, during the decoding and set up process of the clock cycle, the program counter P (or more specifically, the program register 62 contained therein) contains the address of the next sequential instruction that would be executed if no jump were performed. This address must be stored. Accordingly, the output [P] of the program register 62 is selected by the multiplexer 78 (FIG. 5) for application to the register 80 of the I register circuit. In turn, the output [L] of the latch 50 (FIG. 3) is selected by the multiplexer 60 (FIG. 4) for application to the A-BUS and to the program register 62, incremented by 1 by the adder 64. Thereby, a jump is made to the address of the subroutine, the next sequential address of the subroutine set in the program register 62, and the return address "pushed" onto the return stack R at the I register circuit, the 8-bit latches 126, 128 incrementing by 1 to automatically perform the push operation of the stack.

The return is executed by use of the ; instruction, which is bit six of the instruction word (the LSB being the first bit, the LSB+1 being the second bit, and so on), may be "embedded" in any other instruction to effect the return. Thus, every subroutine can end in any instruction, together with its sixth bit (which would normally be a "$\emptyset$") set to a "1" to simultaneously execute the last instruction and perform the return necessary.

The return is effected by communicating the output [I] of the register 80 of the I register circuit (which should contain the return address) to the A-BUS via the multiplexer 60 so that at the end of the decode/set up time, the parameter stack R is "popped" and the content of the memory location indicated by the output [I] is passed by the main memory port M to the instruction decode unit 14 and loaded in the latch 50.

The IF instruction performs a jump (to an address formed from the low-order twelve bits of [L] and the high-order four bits of the program register 62) after testing the T register for a ∅. Accordingly, the output T=∅ is coupled from the zero detect circuit 146 of the ALU (FIG. 9) to the instruction decode circuit 52 (FIG. 3) and utilized, in connection with the content of the latch 50 to determine whether or not a jump is to be effected. If the content of the T register is, in fact, ∅, the jump is performed in the same manner as described with respect to the :word instruction. If not, the content of the program register 62 is coupled to the A-BUS.

The LOOP instruction utilizes the I=∅ generated by the zero test circuit 82 of the I register circuit (FIG. 5) in much the same manner as the IF instruction uses the T=∅ signal. If the I=∅ is not true, the jump is taken, and the register 80 is loaded with its prior content −1; that is, the content of the register 80 is decremented by 1 via the adder 84 and input 4 of the multiplexer 78.

The ELSE instruction is an unconditional jump. This instruction always causes the multiplexer 60 (4) to select the output [L] from the instruction decode unit 14 to be communicated to the A-BUS.

Indexing Instructions

Certain iterative operations capable of being performed by the microprocessor and are set up by the four indexing instructions, which are listed below in TABLE IV. These instructions set an index into the register 80 of the I register circuit, which is ultimately used for keeping track of the number of iterations performed by repeatedly (each clock cycle) decrementing the register 80 until its content becomes ∅.

TABLE IV

| OP CODE (OCTAL) | INDEXING INSTRUCTION MNEMONIC | ACTION |
|---|---|---|
| 147302 | I | I located in T, T pushed onto parameter stack |
| 147321 | R> | Pop return stack, push I onto parameter stack |
| 157201 | >R | Pop parameter stack, push T onto return stack |
| 157221 | TIMES | Repeat |

The I instruction pushes the content of the I register (i.e., the register 80—FIG. 5) onto the parameter stack S. During decode and set up time of this instruction, the output [I] is coupled to the T register via the multiplexer 142 and arithmetic-logic circuit 144. It should be evident that in order to pass the output [I] to the T register, the multiplexers 160(Y₆)–160(Y₁₅) are set by the OP-SELECT signal to select only the U operand for communication to the bus line 154. In addition, the output [N] of the N register is pushed onto the parameter stack S, while the register 98 of the N register receives the output [T] of the T register.

The R> and >R instructions function to move data, through the ALU, between the return and parameter stacks R and S. The R> instruction moves data from the return memory 26, through the I register circuit, the ALU, and the N register circuit to the parameter memory 24. Its execution sees the following simultaneous operations: the content of the top memory location of return memory 26, as indicated by the content of the 8-bit latch 128 of the stack pointer J (FIG. 8) is read into the register 80 of the I register circuit (FIG. 5); the output [I] of the I register circuit is passed, via the multiplexer 142 and arithmetic-logic circuit 144, to and loaded into the T register; the output of the [T] of the T register is passed, via the multiplexer 96 (FIG. 6) to the register 98 of the N register, and loaded therein; and the output [N] of the N register is loaded into the next available memory location of parameter memory 24, as indicated by the 8-bit latch (not shown) of the stack pointer K corresponding to the 8-bit latch 126 of the stack pointer J.

The instruction >R performs essentially the same parameter move, except that data is moved from the parameter stack S through the ALU to the return memory 26.

The TIMES instruction causes the microprocessor 10 to begin iterative operation. At least one precondition must be met before the TIMES instruction can be used: the I register circuit must contain the index, i.e., the number (−2) indicative of the number of iterative steps desired. Following the TIMES instruction must be the instruction that is to be repetitively performed such as, for example, one of the multiply, divide, or square root instructions described above with reference to TABLE I (remember, these instructions are single-step only unless used with the TIMES instruction), or one of the data fetch or store instructions described below.

The index that is to be contained in the I register circuit is two less than the actual desired number of iterative steps. The reason for this will be seen in the following discussion of the iterative operation.

When the TIMES instruction is received and decoded by the instruction decode unit 14, a repeat flag or flip-flop (not shown) contained in the instruction decode circuit 52 is set, and one further access of main memory 12 is made to retrieve the next sequential instruction, which will be the one repetitively executed. Thus, the instruction following the TIMES instruction is loaded in the latch 50 of the instruction decode unit 14, and decoded; and execution begins. Each execution of the instruction terminates in a test of the I=∅ signal by the instruction decode circuit 52. If this signal is not true, the register 80 of the I register circuit is decremented in the manner described above and the instruction held in the latch 50 is executed again. When the I=∅ from the zero test circuit 82 of the I register circuit is finally true, the instruction has been executed the number of times indicated by the content of the register 80 when the iterative process began, plus 1 (this latter execution results from the fact that the test of I=∅ is performed after instruction execution). When the next CLOCK (and the CLK signal derived therefrom) is received, the repeat flag (not shown) contained in the instruction decode circuit 52 of the instruction decode unit 14 is reset, but the instruction is executed one additional time.

Data Transfer Instructions

The data transfer instructions concern data transfers between the microprocessor 10 and the main memory 12, the I/O port 30 and any external element connected thereto, and between various internal registers of the microprocessor. To a certain extent, the indexing instructions may be considered data transfer instructions, since they also concern transfers between the parameter and return stacks. However, their main focus is the content of the I register circuit (for subsequent iterative instruction execution using the TIMES instruction) and, to a lesser extent, the T register of the ALU.

The category of data transfer instructions include instructions that contain the data to be transferred; instructions that contain the address of the main memory location 12 at which the data to be transferred resides; instructions that infer a memory location address; and instructions capable of utilizing the 5-bit X-BUS in an extended address operation.

TABLE V
SHORT LITERAL FETCH

| OP CODE (OCTAL) | INSTRUCTION MNEMONIC | ACTION |
|---|---|---|
| 1575nn | nn | nn located in T; T pushed onto parameter stack |
| 1544nn | nn + | nn + T loaded in T |
| 1546nn | nn +$_c$ | nn + T + carry loaded in T |
| 1524nn | nn — | T — nn loaded in T |
| 1526nn | nn —$_c$ | T — nn + carry loaded in T |
| 1564nn | nn SWAP — | N — nn loaded in T |
| 1566nn | nn SWAP —$_c$ | N — nn + carry load in T |
| 1534nn | nn OR | T OR nn loaded in T |
| 1554nn | nn XOR | T XOR nn loaded in T |
| 1514nn | nn AND | T AND nn loaded in T |

TABLE VI
FULL LITERAL FETCH

| OP CODE (OCTAL) | INSTRUCTION MNEMONIC | ACTION |
|---|---|---|
| 147500 | n | Data from memory loaded in T; T pushed onto parameter stack |
| 144400 | n+ | Data from memory + T loaded in |
| 144600 | n+$_c$ | Data from memory + T + carry loaded in T |
| 142400 | n— | T — data from memory located in T |
| 142600 | n—$_c$ | T — data from memory + carry loaded in T |
| 146400 | n SWAP — | N — data from memory loaded in |
| 146600 | n SWAP —$_c$ | N — data from memory + carry loaded in T |
| 143400 | n OR | T OR data from memory loaded in T |
| 145400 | n XOR | T XOR data from memory loaded in T |
| 141400 | n AND | T AND data from memory loaded in T |

Set forth above, in TABLES V and VI are those instructions involving data transfers to a location within the microprocessor 10. The Short Literal Fetch instructions load or leave a result in the T register and either push the previous content of that register onto the parameter stack or pop the stack. Thus, the nn instruction causes the instruction decode circuit 52 to output the five bits embedded in the instruction as [SL] which are applied to the input 1 of the multiplexer 142 of the ALU. The ALU-CTL signal transfers the [SL] to the operand input 144b of the arithmetic-logic circuit 144 as a 16-bit data word: the lower five bits being nn (i.e., [SL]), and eleven high-order bits of zeros. At the same time, the content of the T register is pushed onto the parameter stack (i.e., the content of the T register is loaded in the register 80 of the I register circuit, and the content of register 80 is stored in the next available memory location, as indicated by the 8-bit latch of the K stack pointer corresponding to the 8-bit latch 128 of the J stack pointer, and the K stack pointer incremented 1).

The nn +1 instruction causes the sum of [SL] (i.e., the five bits of nn) and the content of the T register are loaded in the T register.

The nn+$_c$, nn —, and nn—$_c$ are similar to nn instruction except that where the c is shown, it is summed with either the sum or difference of the content of the T register and the 5-bit [SL].

The nn OR, nn XOR, and nn AND instructions perform the logical operations indicated between [SL] and T, loading the result in the T register.

The Full Literal Fetch instructions (TABLE VI, above) involve a data transfer directly from the main memory 12 to the microprocessor 10. Thus, for example, the n instruction will cause the content of the accessed memory location to be pushed onto the parameter stack S at the N register circuit (i.e., the register 80 (FIG. 5)). The second cycle of the execution of this instruction "swaps" the content of the T register and register 98 so that the end of the execution of this two-cycle operation finds the T register containing the accessed data and the register 98 containing the prior 98 content of the T register, and the prior content of the register 98 has been pushed onto the parameter stack S.

To amplify execution of this instruction: Referring to FIG. 11A, assume that the instruction is latched in the latch 50 at the time indicated as $T_3$ of the CLOCK (i.e., CLK) signal. During the decode time $T_4$ the instruction is decoded, the program counter P (FIG. 1) incremented, and the address of the next sequential memory location, which contains the data desired, is communicated via the multiplexer A and the A-BUS to the main memory 12. In response, the data contained in the memory location designated by the applied address will be put on the data bus 13, passed by the main memory port M, and applied, as [M] to the N register, and communicated via the multiplexer 96 to the register 98. At the next clock pulse, i.e., at the time $T_5$ (FIG. 11A), the desired parameter is loaded in the register 98. Also, at time $T_5$, the CLK signal to the latch 50 is inhibited by the EN-CLK signal; the latch 50, therefore, retains the n instruction. The instruction decode circuit 52 continues the decode cycle, issuing those internal gating and command signals necessary to cause the output [N] of the N register to be conducted to the operand input 144b of the arithmetic-logic circuit 144 via the multiplexer 142 to be added with the content of the T register. At the time indicated as $T_6$, the output [N] of the N register circuit is loaded into T.

The remaining instructions are similar, and self-explanatory to a certain extent, except that they do not involve, in effect, a push of the parameter stack S. For example, the n+$_c$ instruction adds the data fetched from memory to the T register with the carry. The n— instruction subtracts the data fetched 30 from memory from the content of the T register and loads the content in the T register; and the n—$_c$ instruction is the same with the addition of a carry. The SWAP-Full Literal Fetch instructions logically swap the content of the N and T registers before the memory access is performed so that the parameter is then subtracted from the T register. The logical functions OR, XOR, and AND logically combine the data fetched from memory with the content of the T register and store the result in the T register.

Listed below are the Data Fetch (TABLE VII) fetch data from the main memory 12 using, as a memory location address, the content of the T register. Thus, for example, the @ instruction causes the output [T] of the T register to be communicated to the A-BUS via the multiplexer 60 (FIG. 4) during the first clock cycle of this two-cycle instruction. The addressed memory location of the main memory 12 is communicated via the DATA BUS 13, the main memory port M, applied to the multiplexer 96 of the N register (FIG. 6) as the output [M] of the main memory port M and, at the end of the first cycle, loaded in the register 98—simultaneously with a push of the prior content of the register 98 onto the parameter stack S. T and N are swapped during the second cycle.

TABLE VII

DATA FETCH

| OP CODE (OCTAL) | INSTRUCTION MNEMONIC | ACTION |
|---|---|---|
| 167100 | @ | Data fetched from memory and stored in N |
| 164000 | @ + | Data fetched, stored in N, data + T stored in T |
| 164200 | @ +$_c$ | Data fetched, stored in N, data + T + carry stored in T |
| 162000 | @ − | Data fetched, stored in N, T − data stored in T |
| 162200 | @ −$_c$ | Data fetched, stored in N, T − data + carry stored in T |
| 166000 | @ SWAP − | Data fetched, stored in N, data − T stored in T |
| 166200 | @ SWAP −$_c$ | Data fetched, stored in N, data − T + carry stored in T |
| 163000 | @ OR | Data OR T stored in T |
| 165000 | @ XOR | Data XOR T stored in T |
| 161000 | @ AND | Data AND T stored in T |
| 1647nn | DUP @ SWAP nn + | |
| 1627nn | DUP @ SWAP nn − | |

SWAP −$_c$, @ OR, @ XOR, and @ AND instructions operate essentially the same as the @instruction insofar as memory fetches are concerned (i.e., the address being derived from the content of the T register), and their execution is as indicated in TABLE VII, above. The DUP @SWAP nn+ and DUP @SWAP nn− require further discussion.

The DUP @ SWAP nn+ instruction: the end result of this instruction is to push the content of the memory location addressed by the content of the T register onto the parameter stack S at the N register circuit, and increment the content of the T register by nn. The DUP @ SWAP nn − results in the identical operation, except that the content of the T register is decremented by nn. These two instructions, when used in combination with the TIES instruction, permits block moment of data from one memory space to another.

TABLE VIII

EXTENDED ADDRESS DATA FETCH

| OP CODE (OCTAL) | INSTRUCTION MNEMONIC | ACTION |
|---|---|---|
| 1675nn | nn X@ | Data fetch from memory and stored in N |
| 1644nn | nn X@ + | Data fetched, stored in N, data + T stored in T |
| 1646nn | nn X@ +$_c$ | Data fetched, stored in N, data + T + carry stored in T |
| 1624nn | nn X@ − | Data fetched, stored in N, T − data stored in T |
| 1626nn | nn X@ −$_c$ | Data fetched, stored in N, T − data + carry stored in T |
| 1664nn | nn X@ SWAP − | Data fetched, stored in N, data − T stored in T |
| 1666nn | nn X@ SWAP −$_c$ | Data fetched, stored in N, data − T + carry stored in T |
| 1634nn | nn X@ OR | Data OR T stored in T |
| 1654nn | nn X@ XOR | Data XOR T stored in T |
| 1614nn | nn X@ AND | Data XOR T stored in T |

The extended address data fetch instruction (TABLE VIII, above) perform the same as their counterparts in the Data Fetch instruction set, except that there is an extended addressing capability. Embedded in the instruction is the parameter nn. This (5-bit) parameter, when the instruction is decoded, issues from the instruction decode circuit 52 as the output [SL] and conducted to the X-BUS of the I/O port 30 (FIG. 1) via the OR gate 230. At the same time, the instruction decode circuit 52 ensures that the X-EN signal is disabled (i.e., a logic LOW, to disable the AND gate 238). Thus, the Extended Address Data Fetches function to override the content of the X-REGISTER 208. Although not specifically shown, the X-BUS is capable of being connected to the main memory 12 and used to access one of a possible thirty-two, 64 KiloByte word memory. The accessed data is, in the case of the nn X@ instruction, loaded in the T register or, in the case of the instructions combine arithmetic/logic operations, the result is loaded in the T register.

TABLE IX

LOCAL DATA FETCH

| OP CODE (OCTAL) | INSTRUCTION MNEMONIC | ACTION |
|---|---|---|
| 1411nn | nn @ | Data fetched from memory location nn, stored in N |
| 1420nn | nn @ + | Data in N, data + T stored in |
| 1422nn | nn @ +$_c$ | Data stored in N, data + T + carry stored in T |
| 1440nn | nn @ − | Data stored in N, T − data stored in T |
| 1442nn | nn @ −$_c$ | Data stored in N, T − data + carry stored in T |
| 1460nn | nn @ SWAP − | Data stored in N, data − T stored in T |
| 1462nn | nn @ SWAP −$_c$ | Data stored in N, data − T + carry stored in T |
| 1430nn | nn @ OR | Data OR T stored in T |
| 1450nn | nn @ XOR | Data XOR T stored in T |
| 1470nn | nn @ AND | Data AND T stored in T |

Local Data Fetch instructions are identical to their counterparts of the Data Fetch and Extended Addressed Data Fetch instructions, insofar as the fetch and operation are concerned. The difference being that the Local Data Fetch instruction each carry with them a 5-bit address that designates the memory location from which the data will be obtained. Thus, execution of each Local Data Fetch instruction will cause the instruction decode circuit 52 to issue the nn portion of the instruction as the [SL] output and apply to the input 5 of the multiplexe 60 (FIG. 4). The A-CTL signal is activated to select input 1 of the multiplexer 60, communicating [SL] to the A-BUS. The remainder of the operation of the instruction is the same as the @ and nn X@ instructions.

TABLE X

INTERNAL DATA FETCH

| OP CODE (OCTAL) | INSTRUCTION MNEMONIC | ACTION |
|---|---|---|
| 1413nn | nn I@ | Content of internal register nn, [nn], pushed onto stack at |
| 1427nn | nn I@ + | [nn] + T loaded in T |
| 1447nn | nn I@ − | T − [nn] loaded in T |
| 1467nn | nn I@ SWAP − | [nn] − T loaded in T |
| 1437nn | nn I@ OR | [nn] OR T loaded in T |
| 1457nn | nn I@ XOR | [nn] XOR T loaded in T |
| 1477nn | nn I@ AND | [nn] AND T loaded in T |
| 1423nn | DUP nn I@ + | [nn] pushed onto parameter stacks; [nn] + T loaded in T |
| 1443nn | DUP nn I@ − | |
| 1463nn | DUP nn I@ SWAP − | |

TABLE X-continued
INTERNAL DATA FETCH

| OP CODE (OCTAL) | INSTRUCTION MNEMONIC | ACTION |
|---|---|---|
| 1433nn | DUP nn I@ OR | |
| 1453nn | DUP nn I@ XOR | |
| 1473nn | DUP nn I@ AND | |

Store Instructions

The instructions that transfer data to the main memory 12 are listed in TABLE XI and XII. These instructions form a memory from the content of the T register (TABLE XI) or from the instruction itself (TABLE X). In the latter case, the 32 pages of 64K words of memory are available.

TABLE XI
DATA STORE

| OP CODE (OCTAL) | INSTRUCTION MNEMONIC | ACTION |
|---|---|---|
| 171000 | ! | N stored at address from T; S popped twice |
| 171100 | DUP ! | N stored at address from T; S popped once |
| 1727nn | SWAP OVER ! nn + | N stored at address from T; nn + T stored in T; S popped |
| 1747nn | SWAP OVER ! nn − | N stored at address from T; T − nn stored in T; S popped |

TABLE XII
EXTENDED ADDRESS DATA STORE

| OP CODE (OCTAL) | INSTRUCTION MNEMONIC | ACTION |
|---|---|---|
| 1714nn | nn X! | N stored at address from T; nn applied to X-BUS; S popped twice |
| 1715nn | DUP nn X! | N stored at address from T; nn applied to X-Bus; S popped once |

TABLE XIII, below, lists those instructions that transfer the data to the lower 32 memory locations of the current gate of memory (that page indicated by the content of the X register). TABLE XIV lists instructions that transfer data from the T register to the other internal registers of the microprocessor 10. In TABLE X nn (in octal) refers to:

| nn (octal) | Destination |
|---|---|
| 00 | J/K stack pointers |
| 01 | I Register Circuit |
| 02 | Program Counter P |
| 04 | MD Register |
| 06 | SR Register |
| 10 | B Register |
| 14 | X Register |

TABLE XIII
LOCAL DATA STORE

| OP CODE (OCTAL) | INSTRUCTION MNEMONIC | ACTION |
|---|---|---|
| 1570nn | nn ! | Store T at memory location nn |
| 1571nn | DUP nn ! | Non-destructive store to memory location nn |
| 1540nn | DUP nn ! + | Store T at nn; store T + N in T and pop S |
| 1560nn | DUP nn ! − | Store T at nn; store N − T in T; pop S |
| 1520nn | DUP nn ! SWAP − | Store T at nn; store T − N in T; pop S |
| 1530nn | DUP nn ! OR | Store T at nn; store T OR N in T; pop S |
| 1550nn | DUP nn ! XOR | Store T at nn; store T XOR N in T; pop S |
| 1510nn | DUP nn ! AND | Store T at nn; store T AND N in T; pop S |

TABLE XIV
INTERNAL DATA STORE

| OP CODE (OCTAL) | INSTRUCTION MNEMONIC | ACTION |
|---|---|---|
| 1512nn | nn I! | T stored at register nn; stack S popped into T |
| 1503nn | DUP nn I! | T stored at register nn |
| 1522nn | DUP nn I! + | T stored at register nn; N + T stored in T; stack S popped into N |
| 1562nn | DUP nn I! − | T stored at register nn; N − T stored in T; stack S popped into N |
| 1542nn | DUP nn I! SWAP − | T stored at register nn; T − N stored in T; stack S popped into N |
| 1532nn | DUP nn I! OR | T stored at register nn; N OR T stored in T; stack S popped into N |
| 1552nn | DUP nn I! XOR | T stored at register nn; N XOR T stored in T; stack S popped into N |
| 1572nn | DUP nn I! AND | T stored at register nn; N AND T stored in T; stack S popped into N |
| 1577nn | nn I@! | Swap content of T and content of register nn with one another |

Attached hereto as Appendix A is a FORTH program listing of an emulation of the microprocessor 10, prepared for DEC PDP/11 computer. This listing or source code was used to validate the design and, in particular, includes the instruction unit decodes of the instruction set of the microprocessor. The listing includes 24 program blocks numbered 128 to 143 (the first nine blocks of code are for testing). Attached as Appendix B are comment blocks 159-173, each respectively corresponding to the program blocks 129-143, each describing, in a line-by-line basis, the intent of the program.

What is claimed is:

1. A microprocessor designed to facilitate use of the computer language known as FORTH comprising in combination:
   a top register for holding at least a first parameter for processing;
   an arithmetic logic unit connected to said top parameter register for processing said first parameter with other parameters and for placing the results of said processing in said top register;
   a main memory;
   an index register for holding a second parameter and addressing said main memory with said second parameter in a first output path and for popping and pushing said second parameter to a return LIFO stack in a second output path;

a next parameter register for holding a third parameter for processing and for reading and writing said third parameter to said main memory in a first direction and popping and pushing said third parameter to a next parameter LIFO stack in a second direction;

an addressing multiplexer for addressing said main memory communicated at least to said index register to channel data to and from said next parameter register;

a clock having a cyclical pulse for moving data between said registers, said clock operatively connected to said registers;

a first swapping connection between said top register and said index register to permit single cycle exchange of said first parameter and said second parameter between said top and index registers;

a second swapping connection between said top register and said next parameter register to permit the single cycle exchange of said first parameter and said third parameter between said top and next parameter registers;

said memory and said return LIFO stack and said next parameter LIFO stack comprising discrete and separate memory areas, each area not accessible to the other areas other than through the registers of said computer;

a counter connected to said addressing multiplexer for receiving a decremented count from said addressing multiplexer and for transmitting to said addressing multiplexer said decremented count to completion of routines; and an output path from said counter to said index register to enable said decremented count to be passed to said index register to push any resident second parameter to the return stack.

2. A processor adapted to receive instructions and to execute multiple operations of a single instruction in parallel, comprising:

an instruction latch;
a main memory data port coupled to said instruction latch;
an instruction decode circuit for decoding an instruction in said instruction latch coupled to said instruction latch and having a plurality of control signal outputs;
a main memory address port coupled to a first one of said control signal outputs;
an arithmetic logic unit having a control input coupled to a second one of said control signal outputs and a first operand input;
an ALU multiplexer having a first output coupled to said first operand input of said arithmetic logic unit, a first input coupled to said main memory data port via a first data path, and a select input coupled to a third one of said control signal outputs;
a top register coupled to a second output of said arithmetic logic unit;
a next parameter register coupled to a second input of said ALU multiplexer via a second data path;
a next parameter memory having a data input/output (I/O) coupled to said next parameter register, said next parameter memory, next parameter register and top register forming a single parameter stack;
an index/return register coupled to a third input of said ALU multiplexer via a third data path;
an index/return memory having a data I/O coupled to said index/return register for storing an index/return stack;
K stack pointer means having only a single pointer register for generating a pointer address for said next parameter memory having an output coupled to an address input of said next parameter memory and an input coupled to a fourth one of said control signal outputs;
a J stack pointer circuit for generating a pointer address for said index/return memory having an output coupled to an address input of said index/return memory and an input coupled to a fifth one of said control signal outputs; and
means for selectively accessing $2^n$ words of said top register in accordance with contents of an n-bit short literal fetch instruction.

* * * * *